(12) United States Patent
Park et al.

(10) Patent No.: US 12,001,635 B2
(45) Date of Patent: Jun. 4, 2024

(54) CAPACITIVE BUTTON INTERFACE DEVICE AND METHOD

(71) Applicant: KORTEK CORPORATION, Incheon (KR)

(72) Inventors: Moon Bae Park, Suwon-si (KR); Kyung In Seo, Incheon (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 18/032,207

(22) PCT Filed: Sep. 30, 2021

(86) PCT No.: PCT/KR2021/013467
§ 371 (c)(1),
(2) Date: Apr. 17, 2023

(87) PCT Pub. No.: WO2022/139127
PCT Pub. Date: Jun. 30, 2022

(65) Prior Publication Data
US 2023/0367432 A1    Nov. 16, 2023

(30) Foreign Application Priority Data

Dec. 24, 2020 (KR) ......................... 10-2020-0182864

(51) Int. Cl.
*G06F 3/044* (2006.01)
*G06F 3/039* (2013.01)
*G06F 3/0482* (2013.01)

(52) U.S. Cl.
CPC ............ *G06F 3/044* (2013.01); *G06F 3/0393* (2019.05); *G06F 3/0482* (2013.01);
(Continued)

(58) Field of Classification Search
CPC ...... G06F 3/0393; G06F 3/044; G06F 3/0362; G06F 3/0488
See application file for complete search history.

(56) References Cited

U.S. PATENT DOCUMENTS 8,599,162 B2 * 12/2013 Argiro ................ G06F 3/04886
345/169
2020/0073513 A1 * 3/2020 Ballan ..................... G06F 3/039
2020/0233521 A1 * 7/2020 Sasaki ..................... G06F 3/044

FOREIGN PATENT DOCUMENTS

JP              6391893 B1    9/2018
KR         101015711 B1    2/2011
(Continued)

OTHER PUBLICATIONS

International Search Report & Written Opinion for PCT/KR2021/013467 mailed on Apr. 1, 2022.

*Primary Examiner* — Koosha Sharifi-Tafreshi
(74) *Attorney, Agent, or Firm* — Schmeiser, Olsen & Watts, LLP

(57) ABSTRACT

A capacitive button interface device is provided and includes: a touchscreen; a capacitive button which can be attached to or detached from the touchscreen; an input device which can input an operation control command; a storage unit for storing setting information and a program for registering the capacitive button; and a control unit which detects information of the capacitive button attached to the upper surface of the touchscreen and stores or registers the information in the storage unit, and which detects an input of the capacitive button for which registration is complete and performs an operation corresponding to the capacitive button.

12 Claims, 37 Drawing Sheets

(52) U.S. Cl.
CPC .............. *G06F 2203/04104* (2013.01); *G06F 2203/04107* (2013.01); *G06F 2203/04808* (2013.01)

(56) References Cited

FOREIGN PATENT DOCUMENTS

| KR | 10-2012-0111197 A | 10/2012 |
|----|-------------------|---------|
| KR | 10-2016-0064846 A | 6/2016  |
| KR | 10-2142525 B1     | 8/2020  |

* cited by examiner

CAPACITIVE BUTTON INTERFACE DEVICE AND METHOD

CROSS-REFERENCE TO RELATED APPLICATIONS

This application claims priority to PCT Application No. PCT/KR2021/013467, having a filing date of Sep. 30, 2021, which is based on Korean App. No. 10-2020-0182864, having a filing date of Dec. 24, 2020, the entire contents all of which are hereby incorporated by reference.

FIELD OF TECHNOLOGY

The following relates to a capacitive button interface device and method, and more specifically, to a capacitive button interface device and method through which various functions of a computing device is controlled by interfacing a capacitive button, which is to be detachably attached, with a surface of a touch screen of the computing device using the touch screen such as a game console.

BACKGROUND

In general, a display unit is installed in an electronic device. A button device is fixed to the display unit. The display unit includes a circuit board, a touch panel, and a glass part, and the button device is connected to the circuit board through wires. In the touch panel, touch detection lines are wired to intersect in horizontal and vertical directions. In addition, the button device is fixed to an upper side of the glass part by screws or latch parts. As a signal of a push button unit is input to the circuit board, a specific function of the electronic device is selected.

However, in conventional electronic devices, since wire passage holes or button mounting holes are formed in a glass part to connect a button device to a circuit board using wires, the rigidity of the glass part can be reduced. In addition, when an impact or external force is applied to the glass part, cracks can occur around the wire passage holes and the button mounting holes.

In addition, when a thickness of the glass part is increased to reinforce the rigidity of the glass part, the manufacturing costs of the glass part can increase, and the touch sensitivity of the glass part can be reduced.

In addition, when external moisture or water enters the inside of the display unit through the wire passage holes or the button mounting holes of the glass part, the display unit can malfunction or be damaged.

In addition, since the button device is fixed to the glass part by screws or latch parts, an installation structure of the button device may be complicated, and manufacturing costs can increase.

In addition, when the glass part or the button device is disassembled or assembled, after the screws or latch parts are removed, the entire button device should be separated from the glass part, and the glass part or button device should be disassembled. Accordingly, the disassembly and assembly time and repair cost of the glass part or the button device can remarkably increase.

Meanwhile, the touch panel is an input device which may be manipulated by directly touching a corresponding point of a display screen that a user wants to input.

In such touch panels, there are a capacitive method, a resistive method, and a touch method using infrared light, sound waves, and pressure, and the like according to the manipulation method, and in the early days, the resistive method, which mainly operates by a pressing force, was mainly used, but in recent years, the capacitive method has been mainly used, and many computing devices (for example, small game consoles, large game machines in casinos, laptop computers, smartphones, smart pads, and the like) using touch screens to which capacitive touch panels are applied are being released.

By the way, when a user controls a computing device by directly touching a touch screen (for example, when the touch screen of a game console is controlled by touching the touch screen using a finger), a finger contact part of the touch screen can be contaminated, and there is a problem that an input sensation is physically reduced because there is no feeling of pressing an actual button. In addition, there is a problem that it is difficult to input while wearing gloves.

Accordingly, a button (in present embodiments below, may be described as a button device for an electronic device or a capacitive button) that may be easily detachably attached to a surface of a touch screen and allows a physical input sensation to be felt without directly touching the touch screen using a user's finger is required.

In addition, from a view point of a computing device, a technology capable of interfacing capacitive buttons with the computing device is required to control various functions according to the purpose of use of the computing device when one or more buttons (that is, button devices for an electronic device or capacitive buttons) are attached to a touch screen.

The related art is disclosed in Korean Patent Publication No. 10-1015711 (Registered on Feb. 10, 2011. BUTTON ADAPTER KIT FOR TOUCH SCREEN).

SUMMARY

An aspect relates to providing a capacitive button interface device and method through which various functions of a computing device, such as a game console, are controlled by interfacing a capacitive button, which is to be detachably attached, with a surface of a touch screen of the computing device using the touch screen.

One aspect of the present invention provides a capacitive button interface device including a touch screen, a capacitive button which is detachably attached to the touch screen, an input device through which an operation control command is input, a storage unit which stores a program for registering the capacitive button and setting information, and a control unit which detects capacitive button information attached to an upper surface of the touch screen, stores or registers the capacitive button information in the storage unit, detects an input from the capacitive button, which has completed registration, and executes an operation corresponding to the capacitive button.

The capacitive button may include a button part that is formed of a transparent material at an upper portion thereof, and an adsorption member attached to the touch screen and a plurality of capacitive contact points which simultaneously protrude to come into contact with the touch screen when the button part is pressed at a lower portion thereof.

The number of capacitive contact points may be at least three.

When a position at which a touch input is received from a user is predesignated according to a program executed by a computing device including the capacitive button interface device, the capacitive button may be attached to a predesignated position, and the control unit may not register the capacitive button.

When the position at which the touch input is received from the user is not predesignated, the control unit may perform button registration after the capacitive button is attached to a position desired by the user and sets a command selected by the user to execute when an input of the capacitive button is received.

When a button registration command is input through the input device, the control unit may output a predesignated guidance message, count the time for which the user presses the capacitive button according to the guidance message. When the time for which the user presses the capacitive button elapses a designated time, the control unit may detect button input information for the capacitive button. In addition, when the button input information is detected, the control unit may process the button input information to calculate button input information processing values, set the button input information processing values to a button number, display a list of commands or functions which correspond to the button number, and store a command or function selected by the user to correspond to each button in a storage unit to complete button registration.

The button input information may include simultaneous touch position information and simultaneous touch number information, and the number of simultaneous touches may be at least three.

The button input information processing values may include simultaneous touch points, the number of simultaneous touches, a center point of each of the touch points, a virtual closed polygon generated by connecting the center points of the touch points using virtual straight lines, and a center and an area of the virtual closed polygon.

When an input of a preregistered capacitive button is detected, the control unit may detect button input information for the capacitive button, process the button input information to calculate a button input information processing value, search for a button number corresponding to the button input information processing value from the storage unit, and execute an operation or command set to correspond to the button number.

Another aspect of the present invention provides a capacitive button interface method including outputting, by a control unit, a predesignated guidance message when a button registration command is input through an input device and counting the time for which a user presses a capacitive button attached to a touch screen according to the guidance message, detecting, by the control unit, button input information for the capacitive button when the designated time for which the user presses the capacitive button elapses, processing, by the control unit, the button input information to calculate button input information processing values when the button input information is detected, setting, by the control unit, the button input information processing values to a button number, and displaying, by the control unit, a list of commands or functions corresponding to the button number, receiving a command or function selected by the user to correspond to each button, and storing the command or function in a storage unit to complete button registration.

The button input information may include simultaneous touch position information and simultaneous touch number information, and the number of simultaneous touches may be at least three.

The button input information processing values may include simultaneous touch points, the number of simultaneous touches, a center point of each of the touch points, a virtual closed polygon generated by connecting the center points of the touch points using virtual straight lines, and a center and an area of the virtual closed polygon.

When an input of the capacitive button, which has completed registration, is detected, the capacitive button interface method may include, detecting, by the control unit, the button input information for the capacitive button, processing, by the control unit, the button input information to calculate button input information processing values, searching for, by the control unit, the button number corresponding to the button input information processing values from the storage unit, and executing, by the control unit, an operation or command set to correspond to the button number.

According to one aspect of the present invention, the present invention can control various functions of a computing device using a touch screen, such as a game console, by interfacing a capacitive button, which is to be detachably attached, with a surface of the touch screen of the computing device.

BRIEF DESCRIPTION

Some of the embodiments will be described in detail, with reference to the following figures, wherein like designations denote like members, wherein.

DETAILED DESCRIPTION

Figure 1:
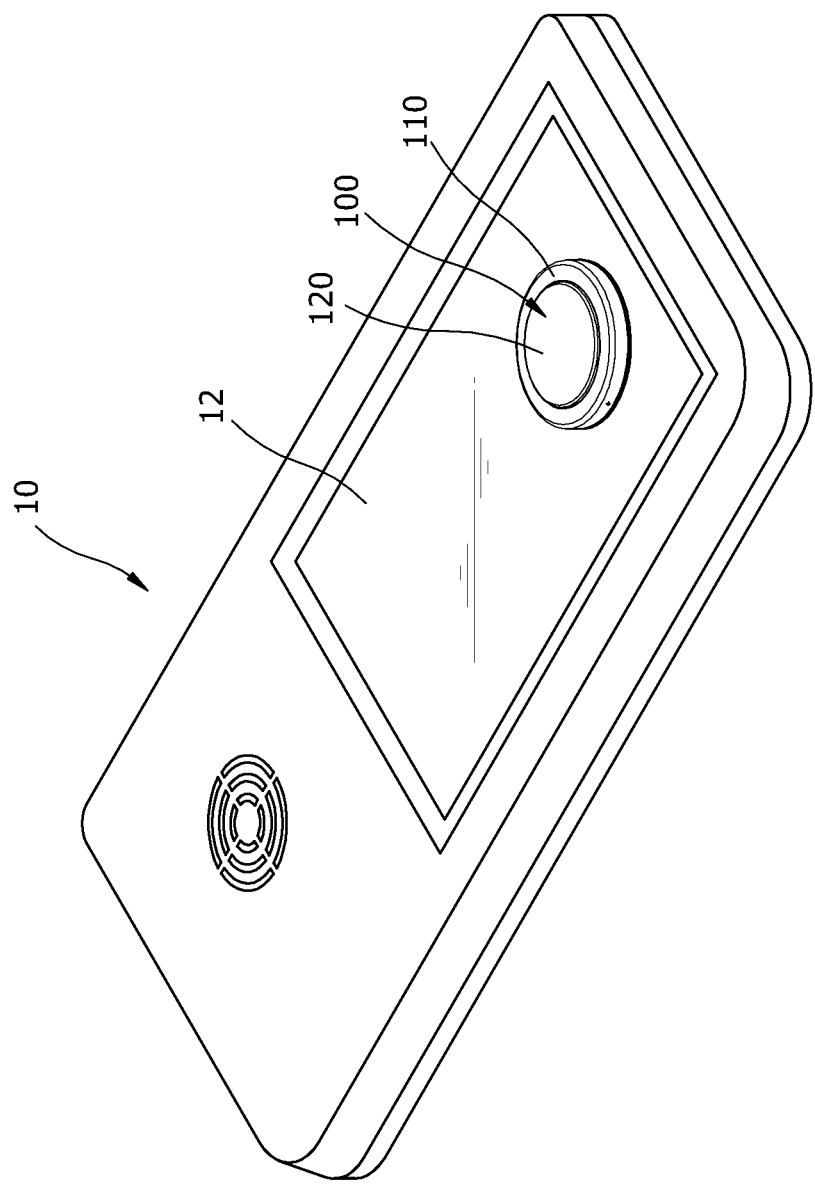
FIG. 1 is a perspective view illustrating a state in which a button device for an electronic device is bonded to a touch panel unit according to a first embodiment of the present invention.

Hereinafter, one embodiment of a capacitive button interface device and method according to embodiments of the present invention will be described with reference to the accompanying drawings.

In this process, thicknesses of lines or sizes of components illustrated in the drawings may be exaggerated for clarity and convenience of explanation. In addition, some terms described below are defined in consideration of functions in embodiments of the invention, and meanings may vary depending on, for example, a user or operator's intentions or customs. Therefore, the definitions of the terms should be interpreted based on the contents throughout this specification.

Figure 2:
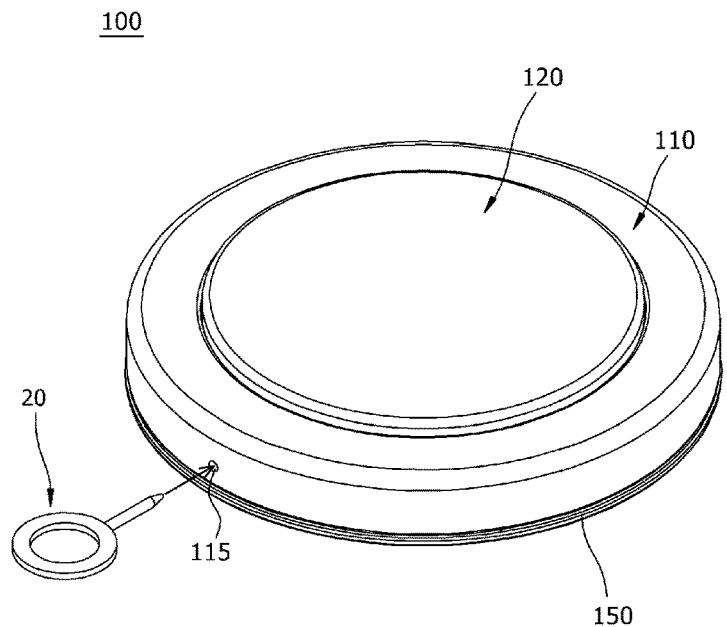
FIG. 2 is a perspective view illustrating the button device for an electronic device according to the first embodiment of the present invention.
Figure 3:
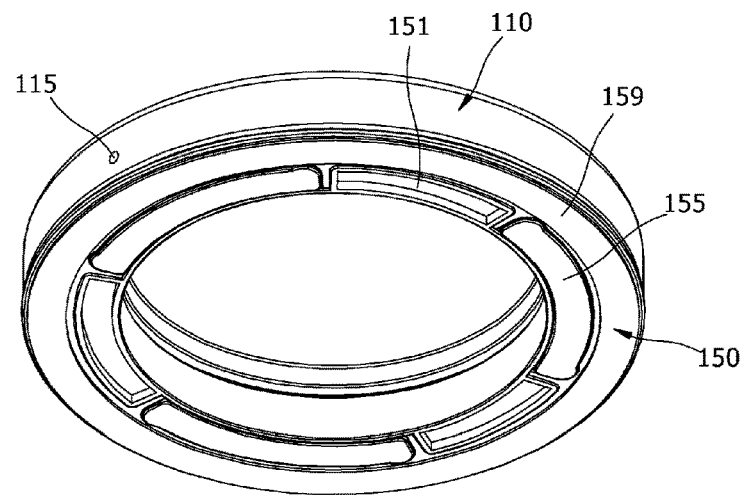
FIG. 3 is a bottom perspective view illustrating the button device for an electronic device according to the first embodiment of the present invention.
Figure 4:
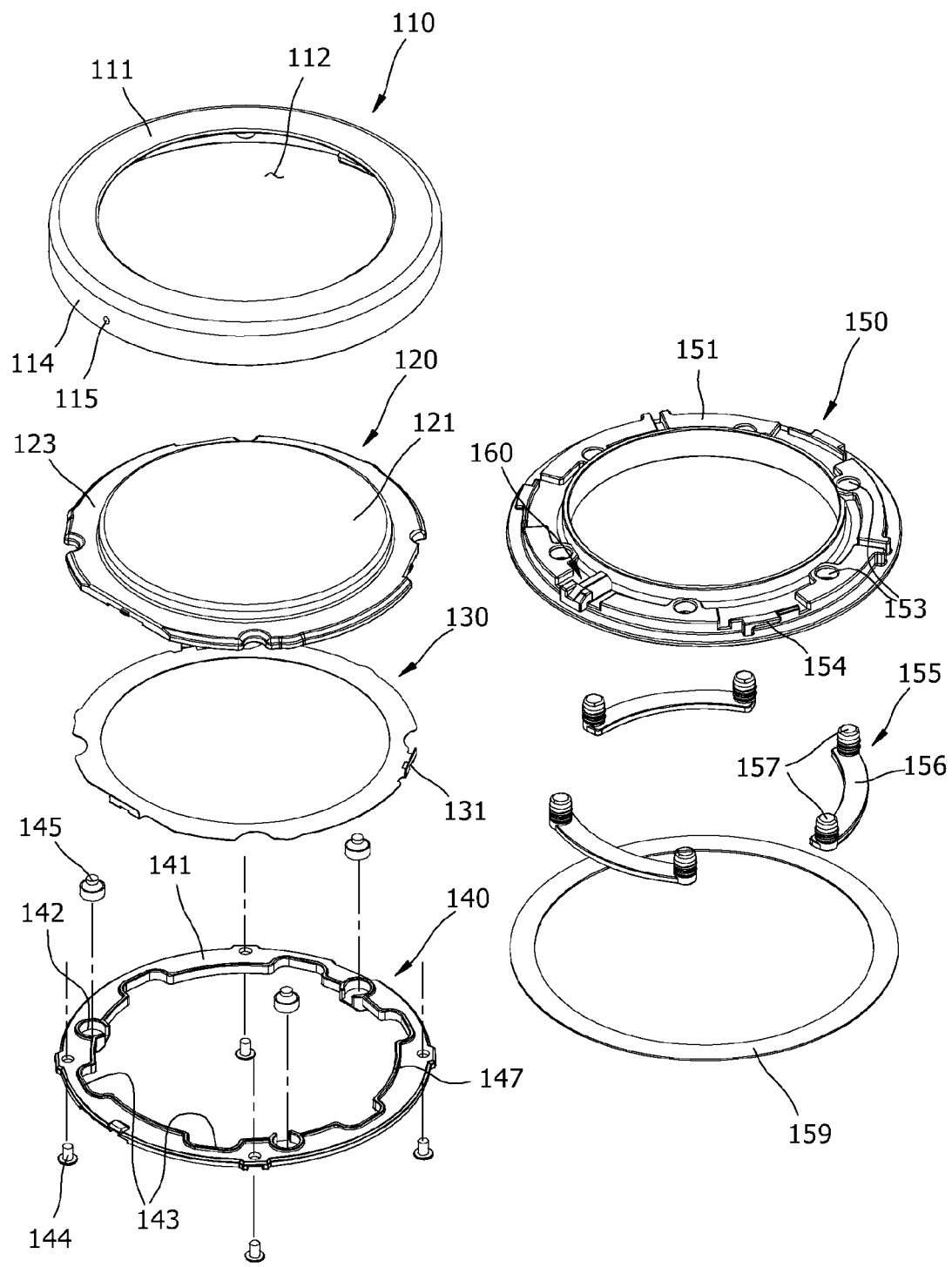
FIG. 4 is an exploded perspective view illustrating the button device for an electronic device according to the first embodiment of the present invention.
Figure 5:
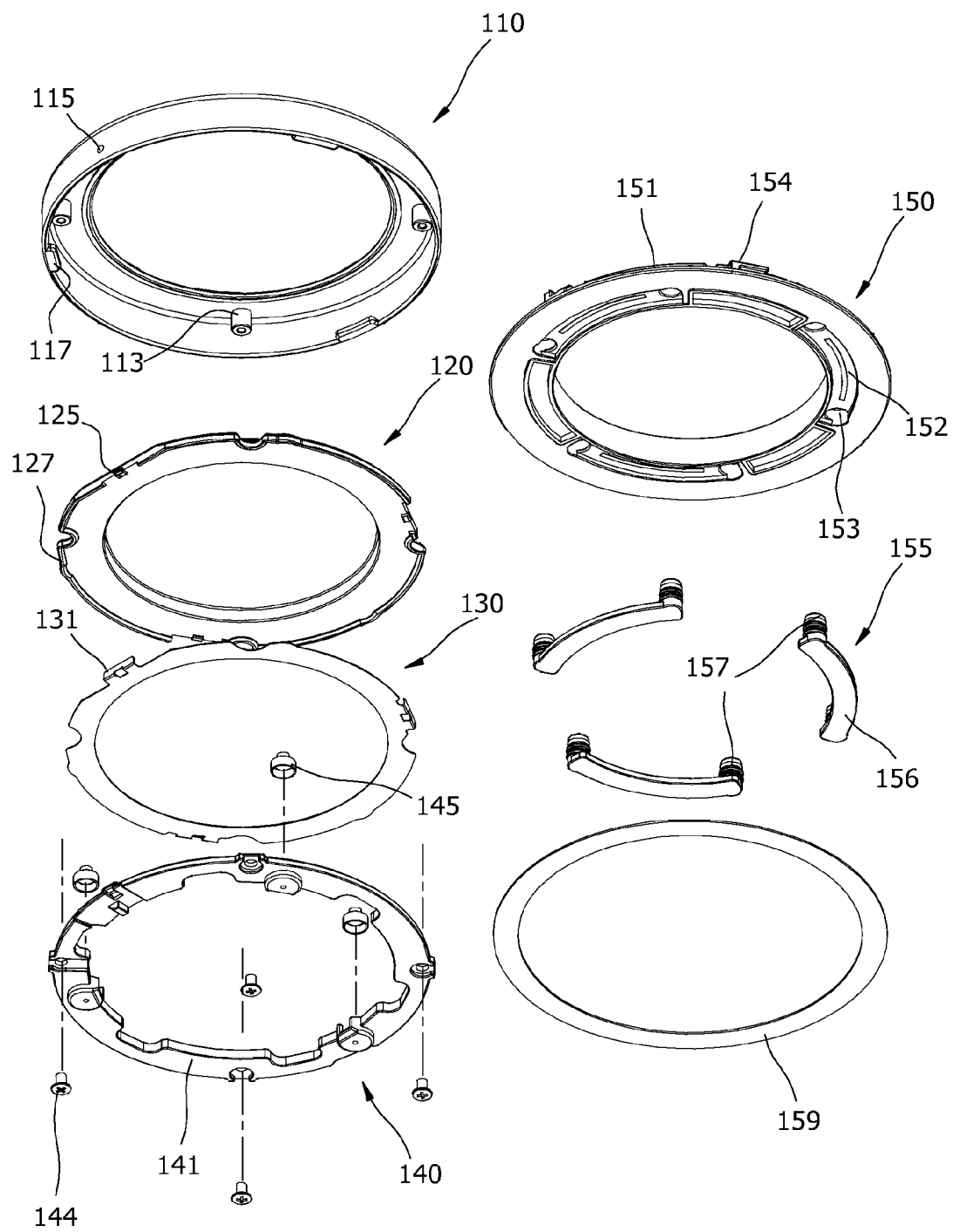
FIG. 5 is an exploded bottom perspective view illustrating the button device for an electronic device according to the first embodiment of the present invention.
Figure 6:
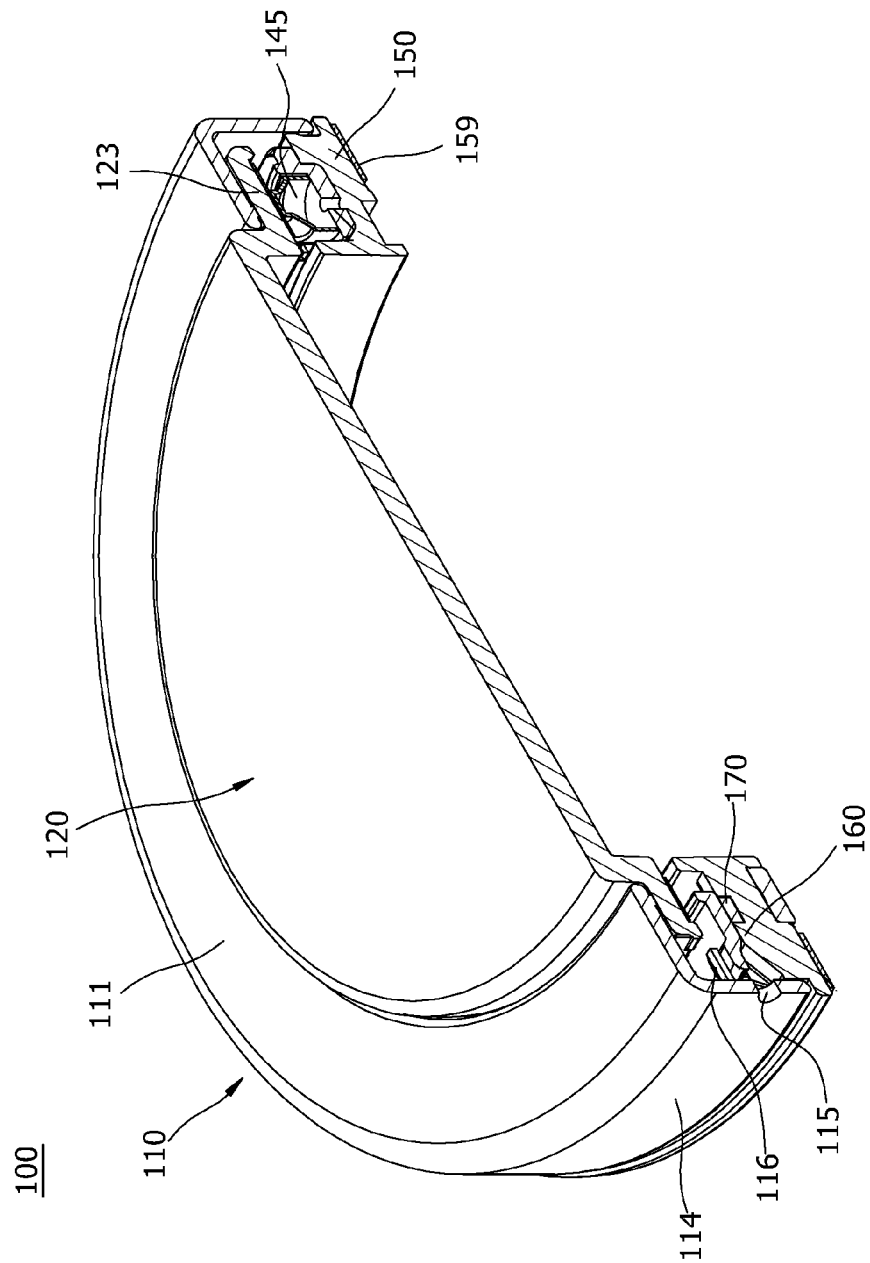
FIG. 6 is a cross-sectional perspective view illustrating the button device for an electronic device according to the first embodiment of the present invention.

FIG. 1 is a perspective view illustrating a state in which a button device for an electronic device is bonded to a touch panel unit according to a first embodiment of the present invention, and FIG. 2 is a perspective view illustrating the button device for an electronic device according to the first embodiment of the present invention. FIG. 3 is a bottom perspective view illustrating the button device for an electronic device according to the first embodiment of the present invention, and FIG. 4 is an exploded perspective view illustrating the button device for an electronic device according to the first embodiment of the present invention. FIG. 5 is an exploded bottom perspective view illustrating the button device for an electronic device according to the first embodiment of the present invention, and FIG. 6 is a cross-sectional perspective view illustrating the button device for an electronic device according to the first embodiment of the present invention.

Referring to FIGS. 1 to 6, a button device 100 for an electronic device according to the first embodiment of the present invention includes a frame part 110, a button part 120, an inner conductive part 130, a support part 140, and an adhesive conductive part 150. An electronic device 10 according to the first embodiment of the present invention includes any device such as a casino machine and an entertainment machine.

A touch panel unit 12 is installed on the electronic device 10. The touch panel unit 12 includes a circuit board (not shown), a touch film part 14 stacked on the circuit board, and a glass part 13 stacked on the touch film part 14. The circuit board includes a liquid crystal display (not shown) and a control unit (not shown). In the touch film part 14, touch detection lines (not shown) are wired to intersect in vertical and horizontal directions. The glass part 13 may be formed of a transparent glass or synthetic resin material.

The frame part 110 includes a conductive material. In this case, the frame part 110 may be entirely formed of a conductive material, or a plating layer may be formed on a surface of a synthetic resin of the frame part 110. Since the frame part 110 includes the conductive material, the electrostatic capacitance of the frame part 110 can be increased. The electrostatic capacitance increases in proportion to the area of the frame part 110 and the permittivity of the conductive material. The frame part 110 may be entirely formed as an annular frame, an elliptic frame, or a similar shape thereto.

The button part 120 is movably coupled to the frame part 110. The button part 120 may be formed in a shape that is the same as or similar to the shape of the frame part 110. The button part 120 may be formed of a synthetic resin material.

The inner conductive part 130 is disposed in the button part 120 to move with the button part 120 and receives electrostatic energy caused by the electrostatic capacitance of the frame part 110. The inner conductive part 130 is disposed under the frame part 110 so that the inner conductive part 130 is not visible from the outside. The inner conductive part 130 may be formed in a shape that is the same as or similar to the shape of the frame part 110. In addition, the inner conductive part 130 may be entirely formed of a conductive material, or the inner conductive part 130 may be manufactured of a mixed material of a synthetic resin material such as silicone and a conductive powder. An outer surface of the inner conductive part 130 may be installed to be spaced approximately 1 to 3 mm from an inner surface of a circumferential part of the frame part 110.

The support part 140 is coupled to the frame part 110 to elastically support the button part 120. The support part 140 may be formed of a flexible synthetic resin material. The support part 140 may be entirely formed in an annular frame shape, an elliptic frame shape, or a similar shape thereto.

The adhesive conductive part 150 is coupled to the frame part 110, is bonded to the touch panel unit 12, and comes into contact with the inner conductive part 130 to transfer the electrostatic energy of the inner conductive part 130 to the touch panel unit 12 when the button part 120 moves. As the adhesive conductive part 150 is bonded to the touch panel unit 12 and the button part 120 is moved downward by an external force, electrostatic energy caused by electrostatic capacitance is transferred to the touch film part 14 of the touch panel unit 12 through the frame part 110, the inner conductive part 130, and the adhesive conductive part 150. Accordingly, as a user operates the button device 100 for an electronic device, a function of the electronic device 10 may be input and selected.

Since the adhesive conductive part 150 is bonded to the touch panel unit 12, a wire passage hole or button mounting hole does not need to be formed in the glass part 13. Accordingly, degradation of the rigidity of the glass part 13 can be prevented, and the glass part 13 can be prevented from cracking caused by an impact or external force. In addition, since a thickness of the glass part 13 does not need to be increased to reinforce the rigidity of the glass part 13, the manufacturing costs of the glass part 13 can be reduced, and a touch sensation can be improved as the thickness of the glass part 13 is reduced.

In addition, since external moisture and water are prevented from entering the glass part 13, a malfunction of or damage to the touch panel unit 12 or the electronic device 10 can be prevented.

In addition, since a separate screw or latch part does not need to be installed to fix the button device 100 to the touch panel unit 12, an installation structure of the button device 100 can be simplified and manufacturing costs can be significantly reduced. In addition, when the glass part 13 or the button device 100 is disassembled or assembled, since a screw or latch part does not need to be released, the disassembly and assembly time and repair cost of the glass part 13 or the button device 100 can be significantly reduced.

The button part 120 includes a button body part 121 and a button flange part 123. The button body part 121 is inserted into a frame hole part 112 of the frame part 110. The button flange part 123 is formed on a circumferential portion of the button body part 121 to be hooked on the frame part 110, and the inner conductive part 130 is disposed on the button flange part 123. Since the button flange part 123 is formed in an annular shape to be hooked on the frame flange part 114, the button part 120 can be prevented from being separated from the frame flange part 114 even when moved upward by an elastic force of the support part 140.

The button part 120 is formed of a transparent material. The button part 120 may be formed of a transparent acrylic or silicone material. Accordingly, the user can visually check an image of the touch panel unit 12 through the button part 120.

The inner conductive part 130 is formed in a ring shape to be attached to the button flange part 123. The inner conductive part 130 is installed to avoid the button body part 121. In this case, a coupling rib 131 extends from the inner conductive part 130, and a coupling protrusion 125 is formed on the button flange part 123 to restrict the coupling rib 131. Accordingly, the inner conductive part 130 can be stably attached to the button flange part 123. However, the inner conductive part 130 may also be directly attached to a lower surface of the button flange part 123 using a conductive adhesive.

Figure 8:
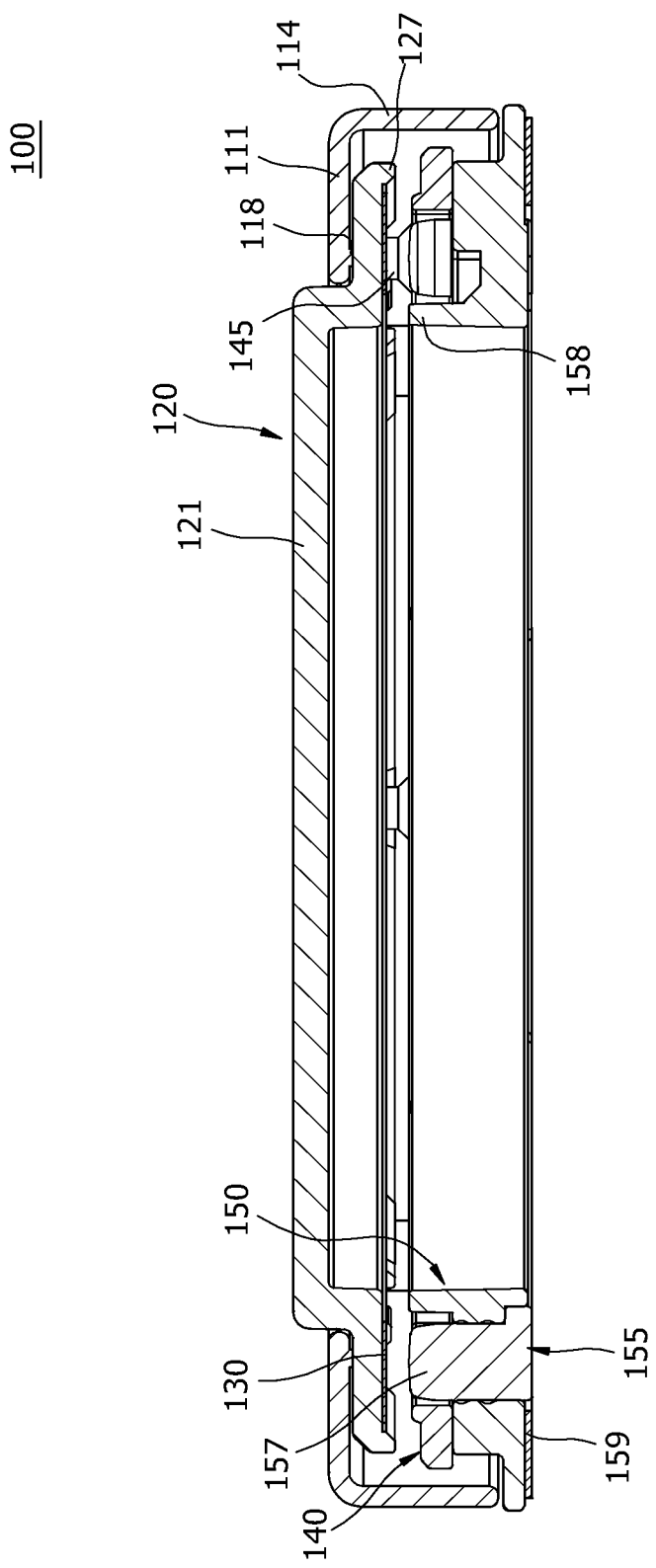
FIG. 8 is a cross-sectional view illustrating the button device for an electronic device according to the first embodiment of the present invention.
Figure 9:
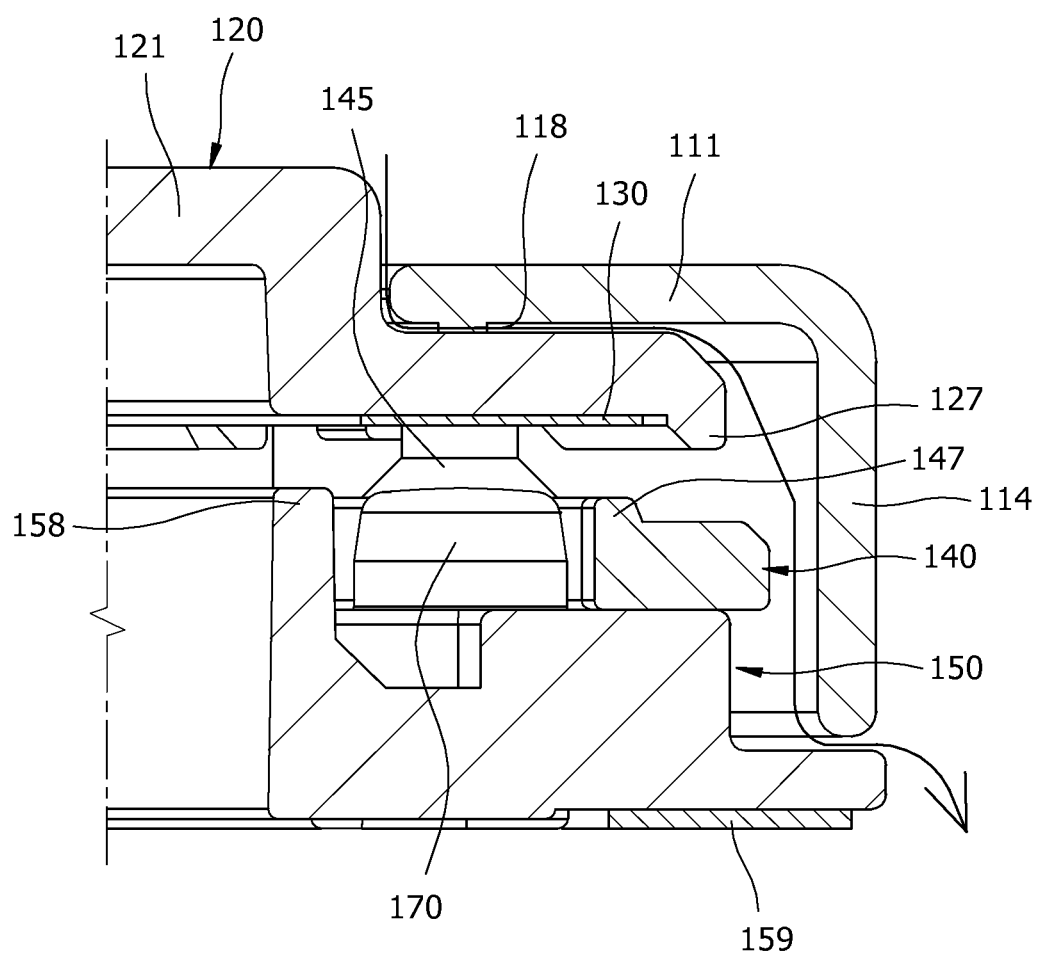
FIG. 9 is a cross-sectional view illustrating a state in which water is drained while a button part is not pressed in the button device for an electronic device according to the first embodiment of the present invention.
Figure 10:
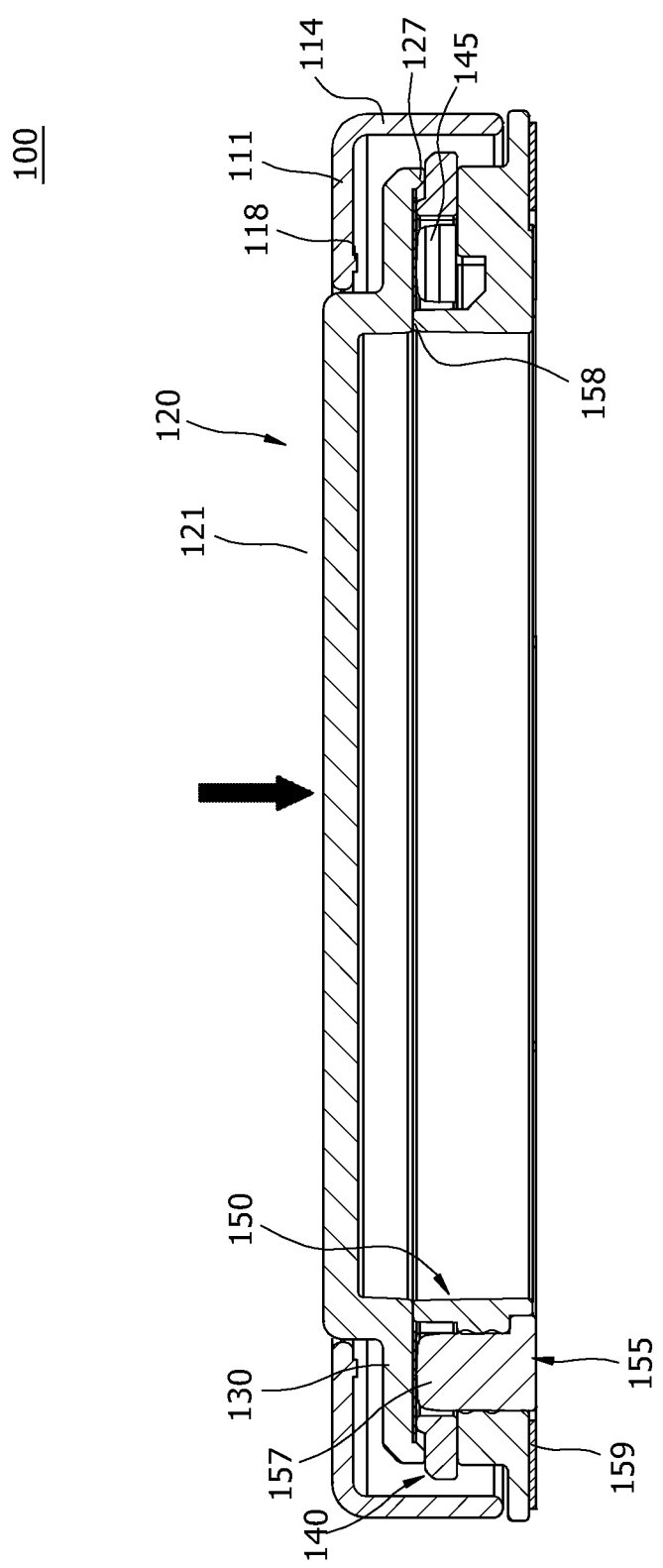
FIG. 10 is a cross-sectional view illustrating a state in which the button part is pressed in the button device for an electronic device according to the first embodiment of the present invention.
Figure 11:
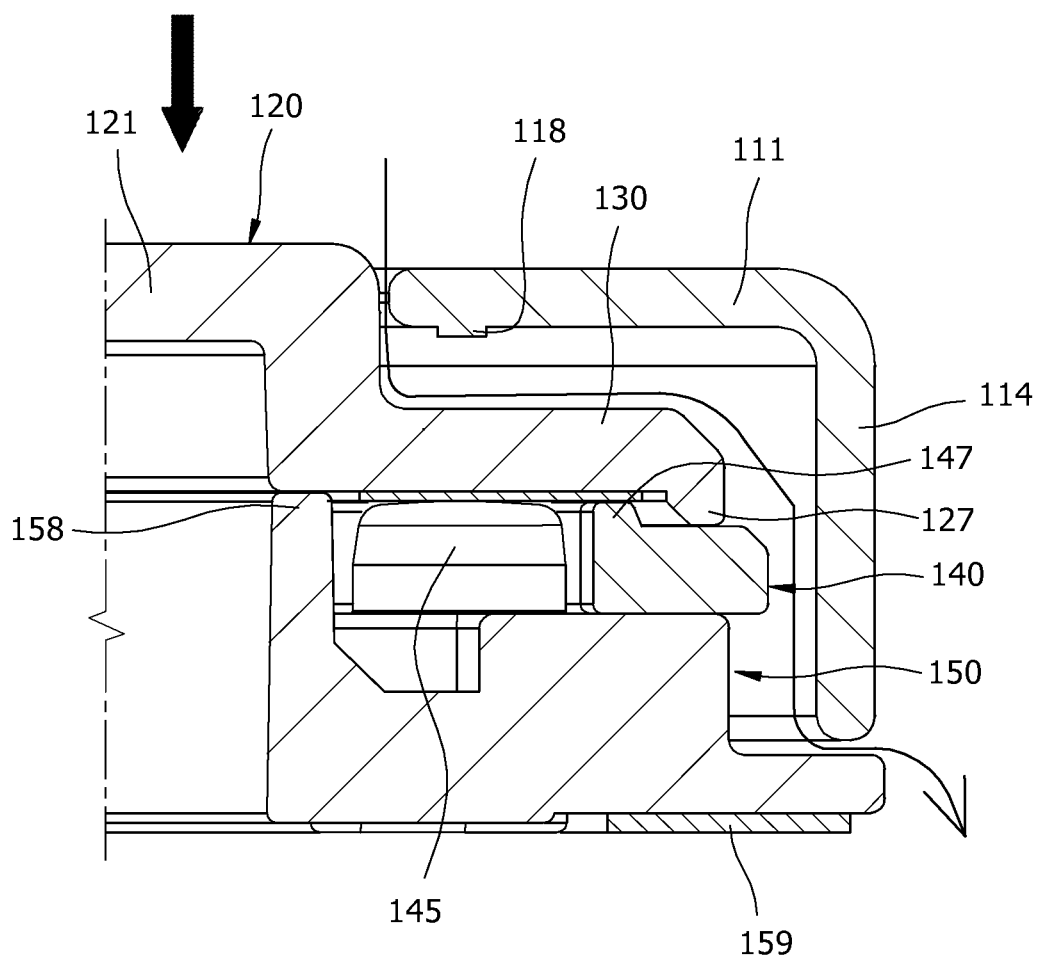
FIG. 11 is a cross-sectional view illustrating a state in which water is drained while the button part is pressed in the button device for an electronic device according to the first embodiment of the present invention.

FIG. 8 is a cross-sectional view illustrating the button device for an electronic device according to the first embodiment of the present invention, and FIG. 9 is a cross-sectional view illustrating a state in which water is drained while the button part is not pressed in the button device for an electronic device according to the first embodiment of the present invention. FIG. 10 is a cross-sectional view illustrating a state in which the button part is pressed in the button device for an electronic device according to the first embodiment of the present invention, and FIG. 11 is a cross-sectional view illustrating a state in which water is drained while the button part is pressed in the button device for an electronic device according to the first embodiment of the present invention.

Referring to FIGS. 8 to 11, the adhesive conductive part 150 includes an adhesive base part 151 and one or more conductive members 155.

The adhesive base part 151 is bonded to the touch panel unit 12. The adhesive base part 151 may be formed in an annular shape or a similar shape thereto. The adhesive base part 151 may be formed of a flexible synthetic resin material. The adhesive base part 151 is bonded to the touch panel unit 12 using an adhesive member 159 such as a conductive adhesive or conductive tape.

The conductive member 155 is coupled to the adhesive base part 151 to be in contact with the touch panel unit 12 and comes into contact with the inner conductive part 130 to transfer the electrostatic energy of the inner conductive part 130 to the touch panel unit 12 when the button part 120 moves. The conductive member 155 may be formed of a mixed material of a synthetic resin material and a conductive powder or of a metallic material. Since the conductive member 155 constitutes a part of the adhesive conductive part 150, the manufacturing costs of the adhesive conductive part 150 can be reduced compared to a component which is entirely formed of a conductive material. In addition, when the number of installed conductive members 155 is increased, a facing area between the conductive members 155 and a contact area of the touch detection lines is significantly increased in the touch panel unit 12. Accordingly, since the transfer area of electrostatic energy caused by electrostatic capacitance is significantly increased, the electrostatic energy can be stably transferred to the touch panel unit 12 no matter which side of the button part 120 is obliquely pressed.

The conductive member 155 includes a conductive rod part 156 coupled to the adhesive base part 151 to be in contact with the touch panel unit 12 and a conductive protrusion 157 formed to protrude from the conductive rod part 156 to pass through the adhesive base part 151 and come into contact with the inner conductive part 130. The conductive rod part 156 may be installed in a circumferential direction of a conductive panel part, and the conductive protrusion 157 may be formed as a plurality of conductive protrusions 157 in each conductive rod part 156. As the conductive protrusion 157 comes into contact with the inner conductive part 130, electrostatic energy of the frame part 110 is transferred to the conductive protrusion 157 through the inner conductive part 130, and the conductive protrusion 157 transfers the electrostatic energy to the touch panel unit 12 through the conductive rod part 156.

The adhesive base part 151 includes a seating part 152 formed to be recessed in the adhesive base part 151 so that the conductive rod part 156 is seated on the seating part 152 and a connecting hole part 153 formed in the seating part 152 so that the conductive protrusion 157 passes through the connecting hole part 153. An upper end portion of the conductive protrusion 157 is exposed to an upper side of the adhesive base part 151 through the connecting hole part 153.

The support part 140 includes a support body part 141 facing the inner conductive part 130 and coupled to the frame part 110 and an elastic member 145 installed on the support body part 141 to elastically support the button part 120. The support body part 141 is formed in an annular shape to correspond to the button flange part 123 of the button part 120. The support body part 141 is disposed to avoid the button body part 121. The elastic member 145 may be formed in a cylindrical or conical shape to be contracted in a longitudinal direction by a pressing force of the button part 120. The elastic member 145 may be formed of a synthetic resin material.

A plurality of coupling members 144 are installed in the support body part 141 to pass through the support body part 141, and a plurality of boss parts 113 are formed on an inner surface of the frame part 110 to be coupled to the plurality of coupling members 144. Accordingly, the support body part 141 can support the button part 120 and the inner conductive part 130 so that the button part 120 and the inner conductive part 130 are not separated from the frame part 110.

In the support body part 141, a plurality of exposed groove parts 143 are formed to be recessed so that the conductive protrusions 157 pass through the plurality of exposed groove parts 143. Since the conductive protrusions 157 pass through the exposed groove parts 143, even when the support body part 141 is disposed between the inner conductive part 130 and the adhesive base part, the inner conductive part 130 may come into contact with the conductive protrusion 157 as the inner conductive part 130 moves downward when the button part 120 is pressed.

The frame part 110 includes a frame body part 111, a frame flange part 114, and a plurality of sliding restriction parts 117.

The frame body part 111 is formed in an annular shape to surround an outer side of the button part 120, the inner conductive part 130, and the support part 140. The frame flange part 114 is formed in an annular shape along a circumferential portion of the frame body part 111. The frame flange part 114 extends downward from the frame body part 111. The plurality of sliding restriction parts 117 are formed to protrude from the frame flange part 114 to be hooked on and restricted by holder parts 154 of the adhesive conductive part 150. The sliding restriction parts 117 extend inward from the frame flange part 114. Each of the holder parts 154 of the adhesive conductive part 150 may be formed in a "r" shape in which an upper side and one side are closed. The plurality of holder parts 154 are formed along a circumferential portion of the adhesive conductive part 150. Accordingly, when the frame part 110 is seated on an upper side of the adhesive conductive part 150 and then rotated at a predetermined angle, the sliding restriction parts 117 are fitted into the holder parts 154 of the adhesive conductive part 150, and thus the frame part 110 can be prevented from being separated upward from the touch panel unit 12.

A circumferential portion of the button flange part 123 and a circumferential portion of the support part 140 are formed to be tapered or rounded, and a circumferential portion of the adhesive base part 151 is disposed further outward than the circumferential portion of the button flange part 123 and the circumferential portion of the support part 140.

A first waterproofing protrusion 118 is formed to protrude downward from the circumferential portion of the frame part 110, and a second waterproofing protrusion 127 is formed to protrude downward from a circumferential portion of the button part 120. In this case, the first waterproofing protrusion is formed in an annular shape or a similar shape thereto on an outer surface of the frame flange part 114 in a circumferential direction (see FIG. 5). In addition, the second waterproofing protrusion 127 is formed in an annular shape or a similar shape thereto in a circumferential direction of the button flange part 123.

When the button part 120 is not pressed, since the first waterproofing protrusion 118 is in close contact with an upper surface of the button flange part 123, most external moisture or water is blocked from flowing into the button part 120 and the adhesive conductive part 150 by the first waterproofing protrusion 118. In addition, moisture or water entering through the first waterproofing protrusion 118 flows along the circumferential portion of the button flange part 123 and the circumferential portion of the support part 140 and drains outside of the frame part 110.

In addition, when the button part 120 is pressed, even when external moisture or water flows through a gap between the frame part 110 and the button part 120, the external moisture or water flows along the circumferential portion of the button flange part 123 and the circumferential portion of the support part 140 and drains outside of the frame part 110. In addition, since the second waterproofing protrusion 127 of the button flange part 123 is in close contact with an upper surface of the circumferential portion of the support part 140, external moisture or water can be blocked from flowing into the button part 120 and the adhesive conductive part 150 by the second waterproofing protrusion 127.

Figure 7:
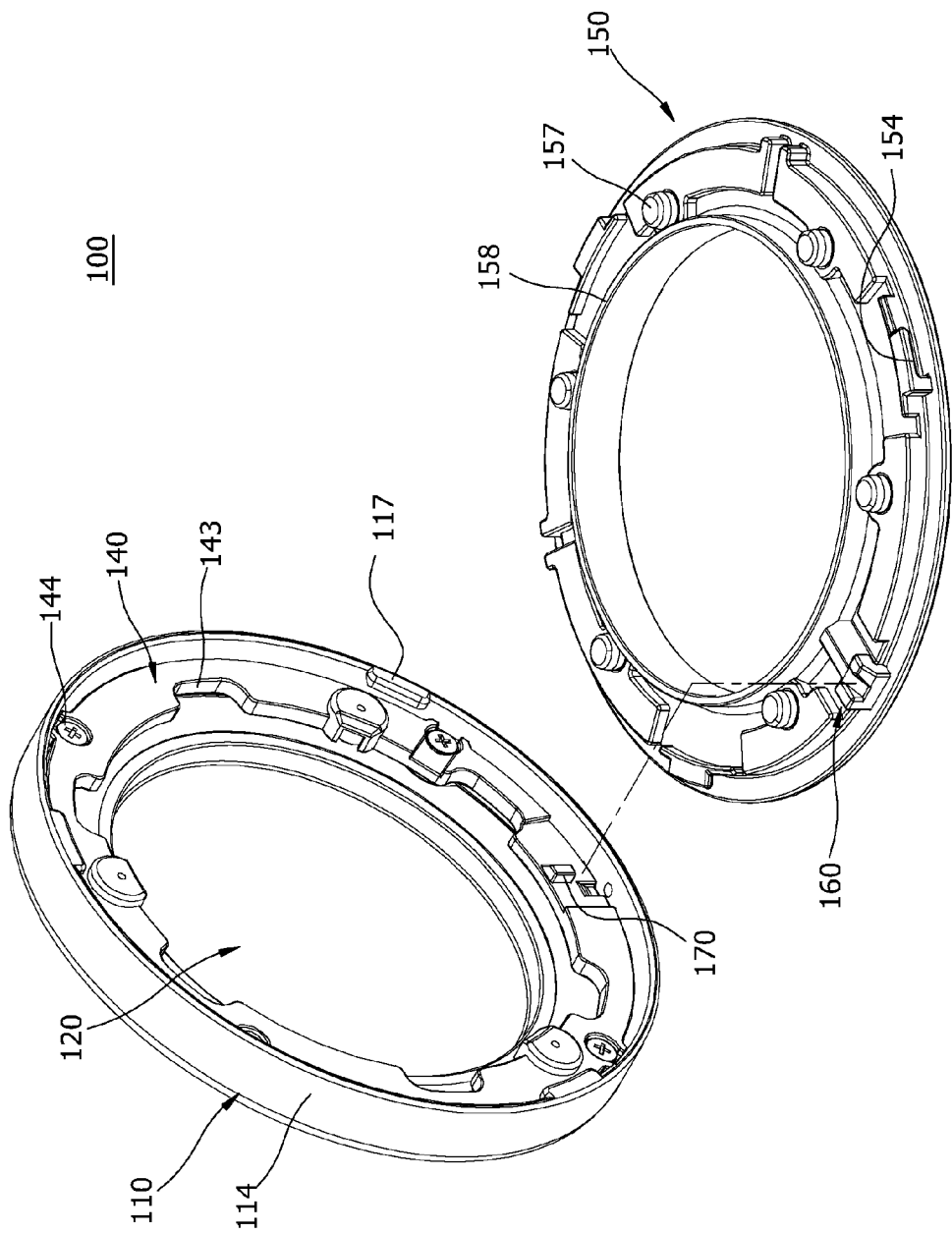
FIG. 7 is a perspective view illustrating a state in which an adhesive conductive part and a frame part are separated in the button device for an electronic device according to the first embodiment of the present invention.

In the adhesive conductive part 150, a third waterproofing protrusion 158 is formed to protrude upward (see FIG. 7). The third waterproofing protrusion 158 is formed inside the adhesive base part 151 and formed in an annular shape in a circumferential direction. Accordingly, moisture or water penetrating or being introduced into the button part 120 may be blocked from flowing into the adhesive conductive part 150 regardless of whether the button part 120 is pressed.

In the support part 140, a fourth waterproofing protrusion 147 is formed to protrude upward (see FIGS. 4 and 9). The fourth waterproofing protrusion 147 is formed in an annular shape on an inner side or outer side of the support part 140 in a circumferential direction. Accordingly, the fourth waterproofing protrusion 147 can block moisture or water entering or being introduced into the button part 120 from flowing into the adhesive conductive part 150 regardless of whether the button part 120 is pressed.

Since the first waterproofing protrusion 118, the second waterproofing protrusion 127, the third waterproofing protrusion 158, and the fourth waterproofing protrusion 147 guide moisture or water to drain naturally, the moisture or water can be prevented from staying inside the button device 100 for an electronic device. In addition, a malfunction of the button device 100 for an electronic device due to moisture or water entering the frame part 110, the inner conductive part 130, and the adhesive conductive part 150 can be prevented.

Figure 12:
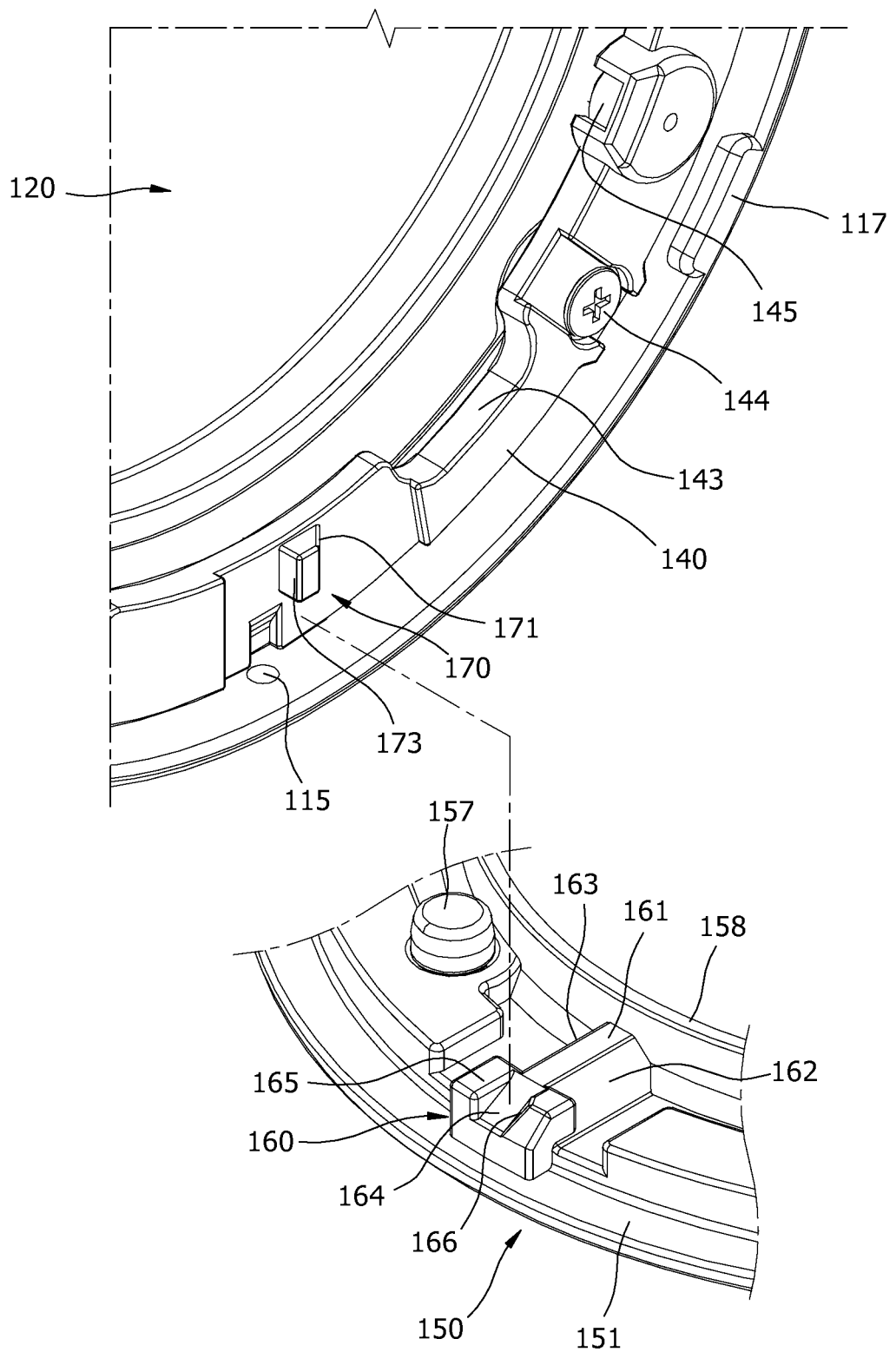
FIG. 12 is an enlarged view illustrating a restriction part and a locking part in the button device for an electronic device according to the first embodiment of the present invention.
Figure 13:
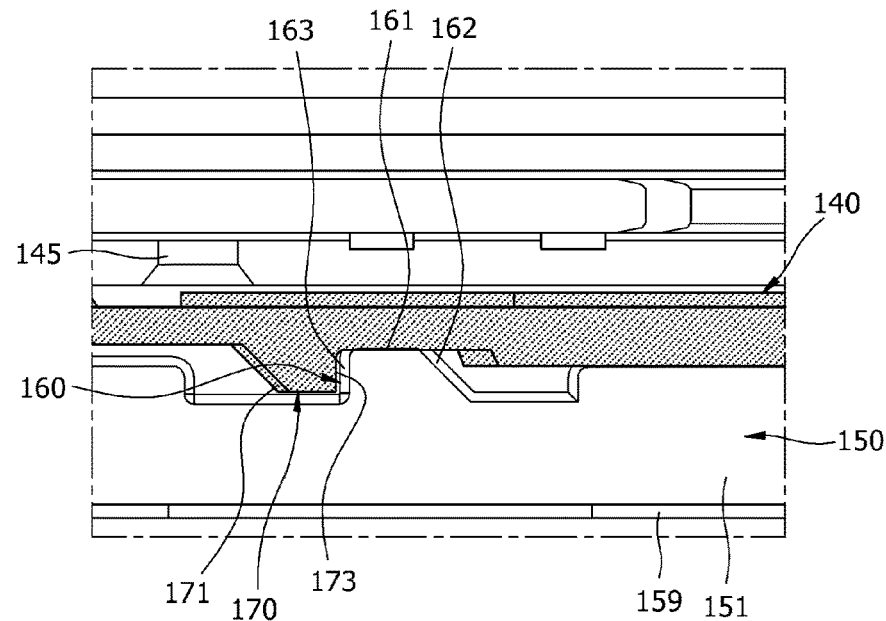
FIG. 13 is an enlarged view illustrating a state in which the locking part is restricted by the restriction part in the button device for an electronic device according to the first embodiment of the present invention.
Figure 14:
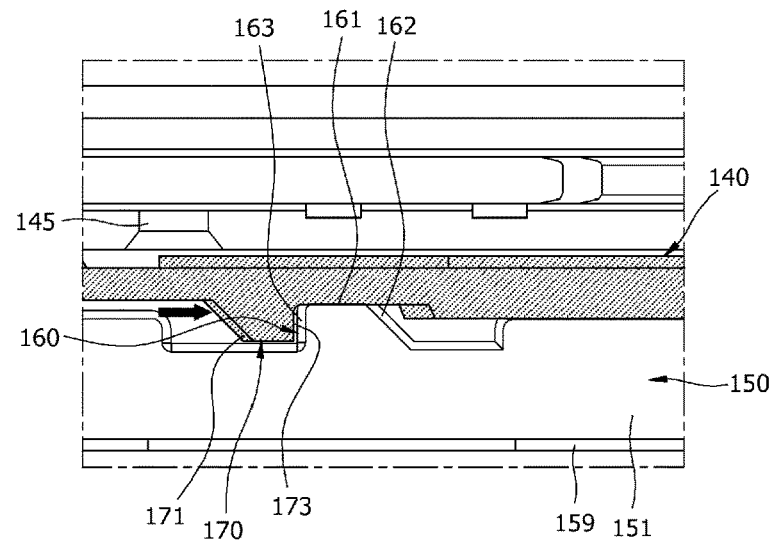
FIG. 14 is an enlarged view illustrating a state in which the rotation of the frame part is prevented as the locking part is restricted by the restriction part in the button device for an electronic device according to the first embodiment of the present invention.
Figure 15:
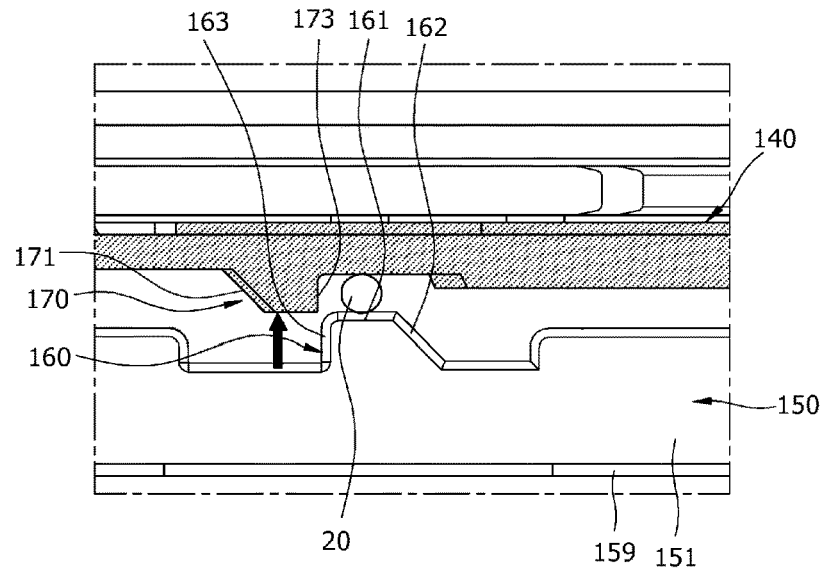
FIG. 15 is an enlarged view illustrating a state in which the locking part is released from the restriction part as a key is inserted into the restriction part in the button device for an electronic device according to the first embodiment of the present invention.
Figure 16:
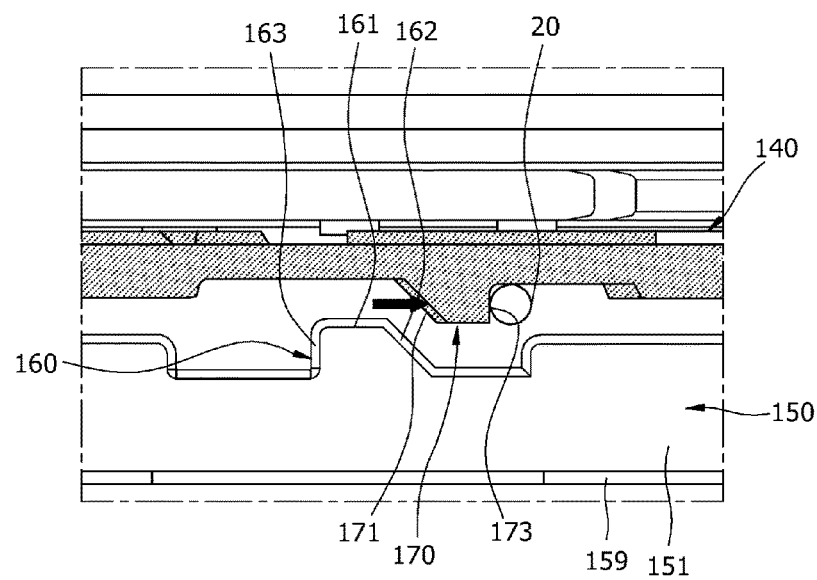
FIG. 16 is an enlarged view illustrating a state in which the locking part is moved to a release region as the frame part is rotated while the key is inserted into the restriction part in the button device for an electronic device according to the first embodiment of the present invention.
Figure 17:
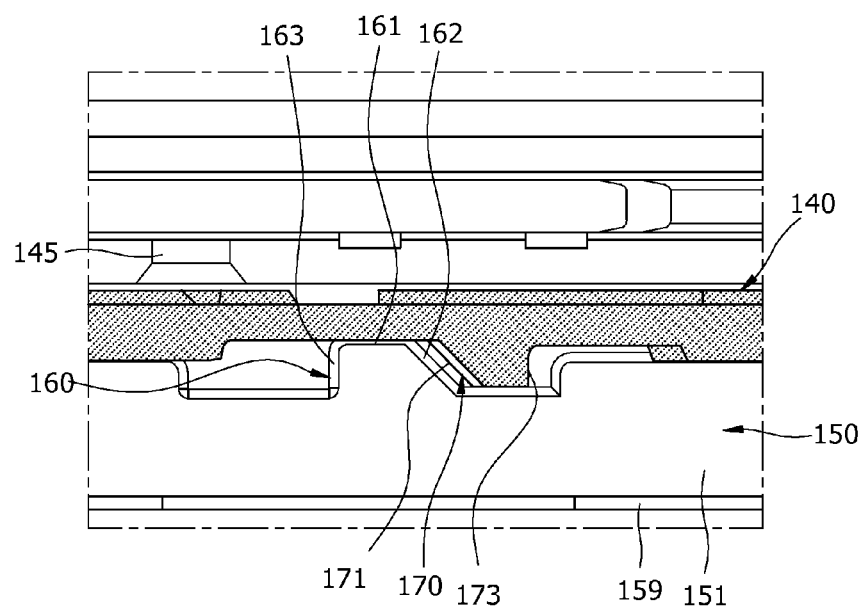
FIG. 17 is an enlarged view illustrating a state in which the key is removed from the restriction part in the button device for an electronic device according to the first embodiment of the present invention.
Figure 18:
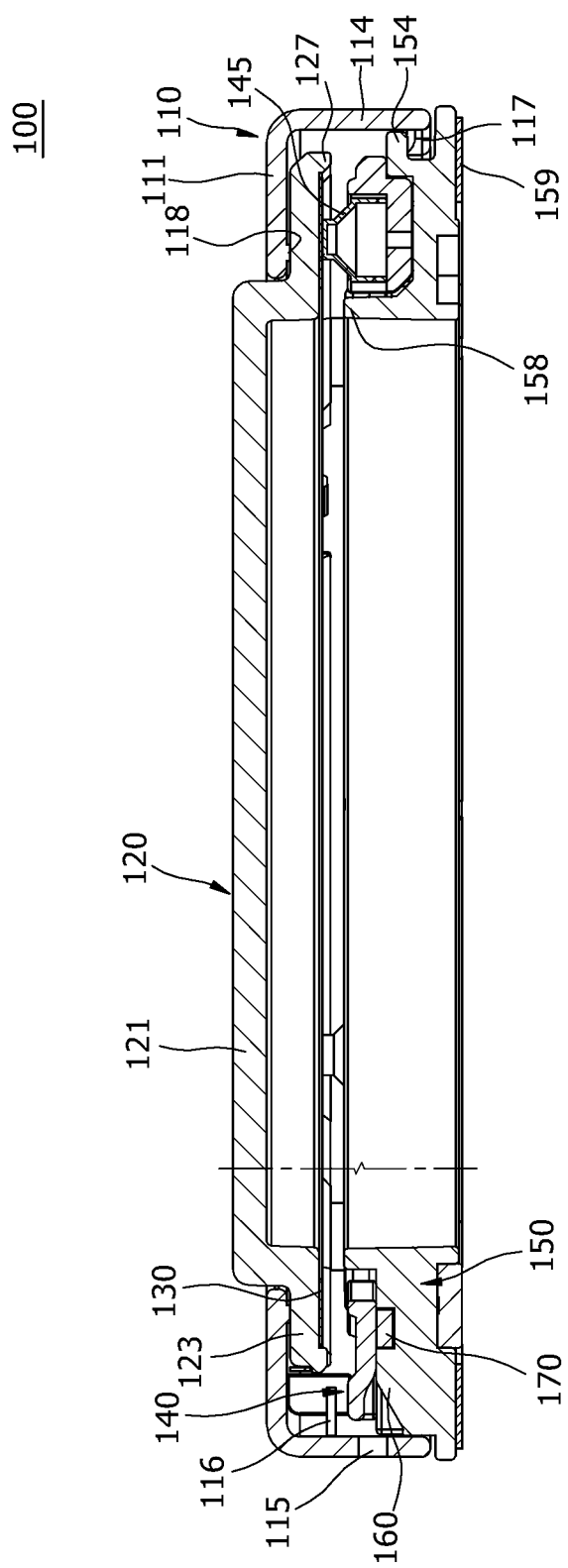
FIG. 18 is a cross-sectional view illustrating a state before the key is inserted into the restriction part in the button device for an electronic device according to the first embodiment of the present invention.
Figure 19:
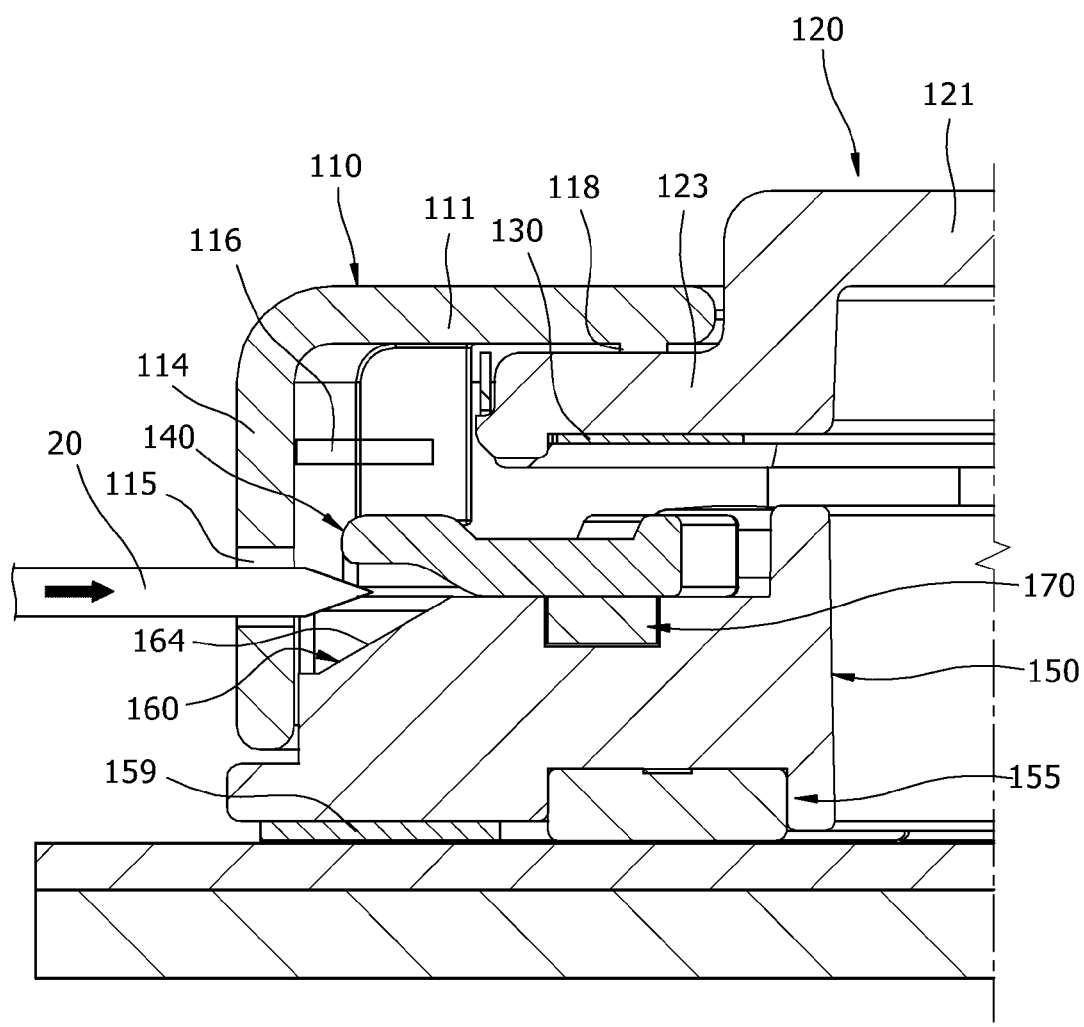
FIG. 19 is an enlarged view illustrating a state in which the key is inserted into the restriction part in the button device for an electronic device according to the first embodiment of the present invention.
Figure 20:
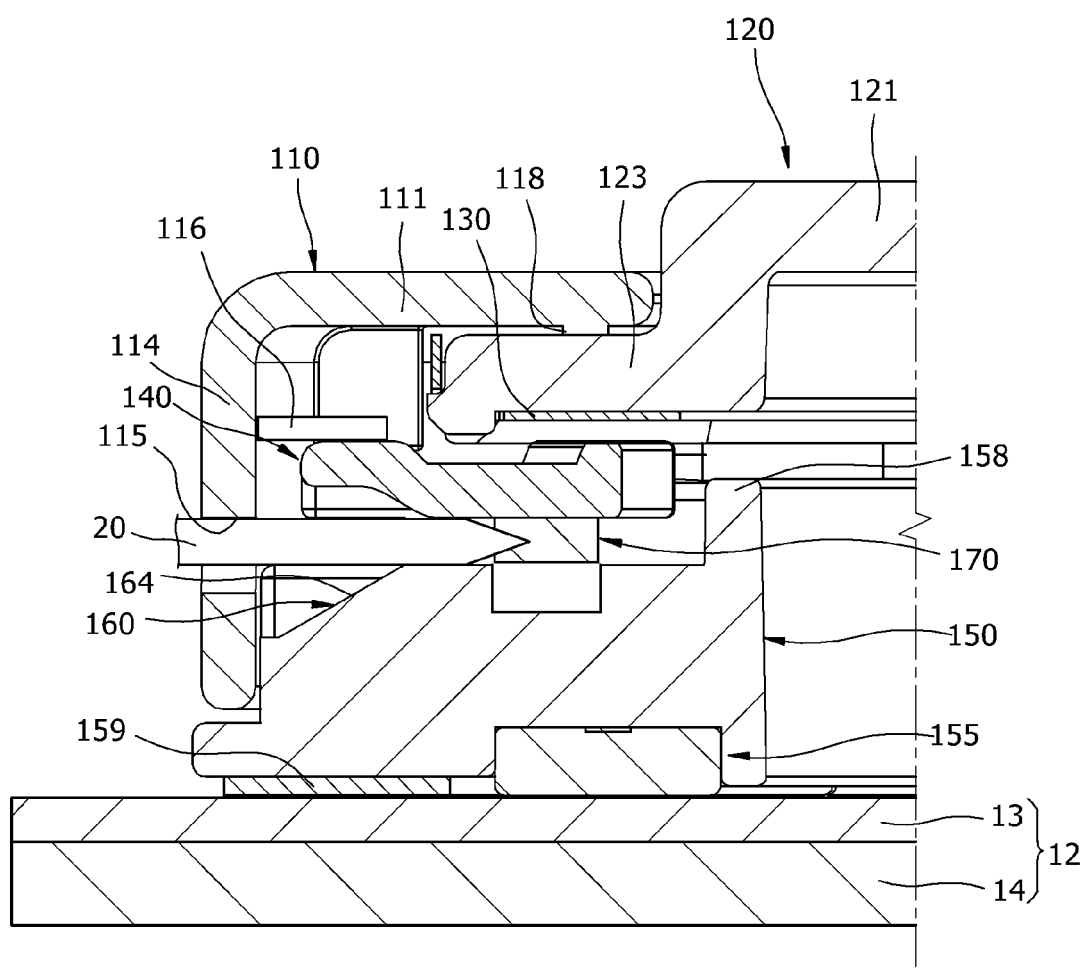
FIG. 20 is an enlarged view illustrating a state in which the locking part is released from the restriction part as the key is inserted into the restriction part in the button device for an electronic device according to the first embodiment of the present invention.
Figure 21:
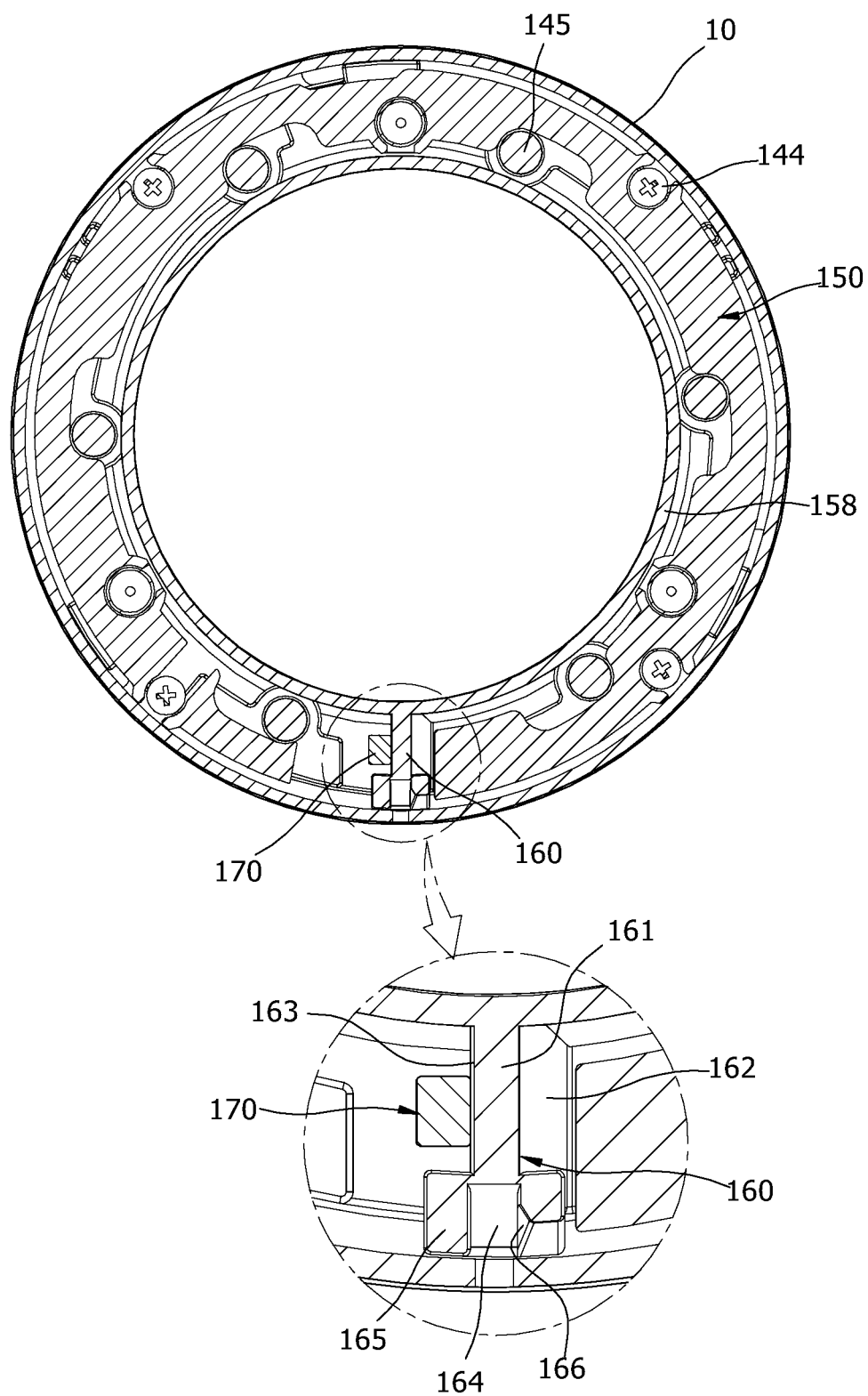
FIG. 21 is a rear view illustrating the state in which the locking part is restricted by the restriction part in the button device for an electronic device according to the first embodiment of the present invention.
Figure 22:
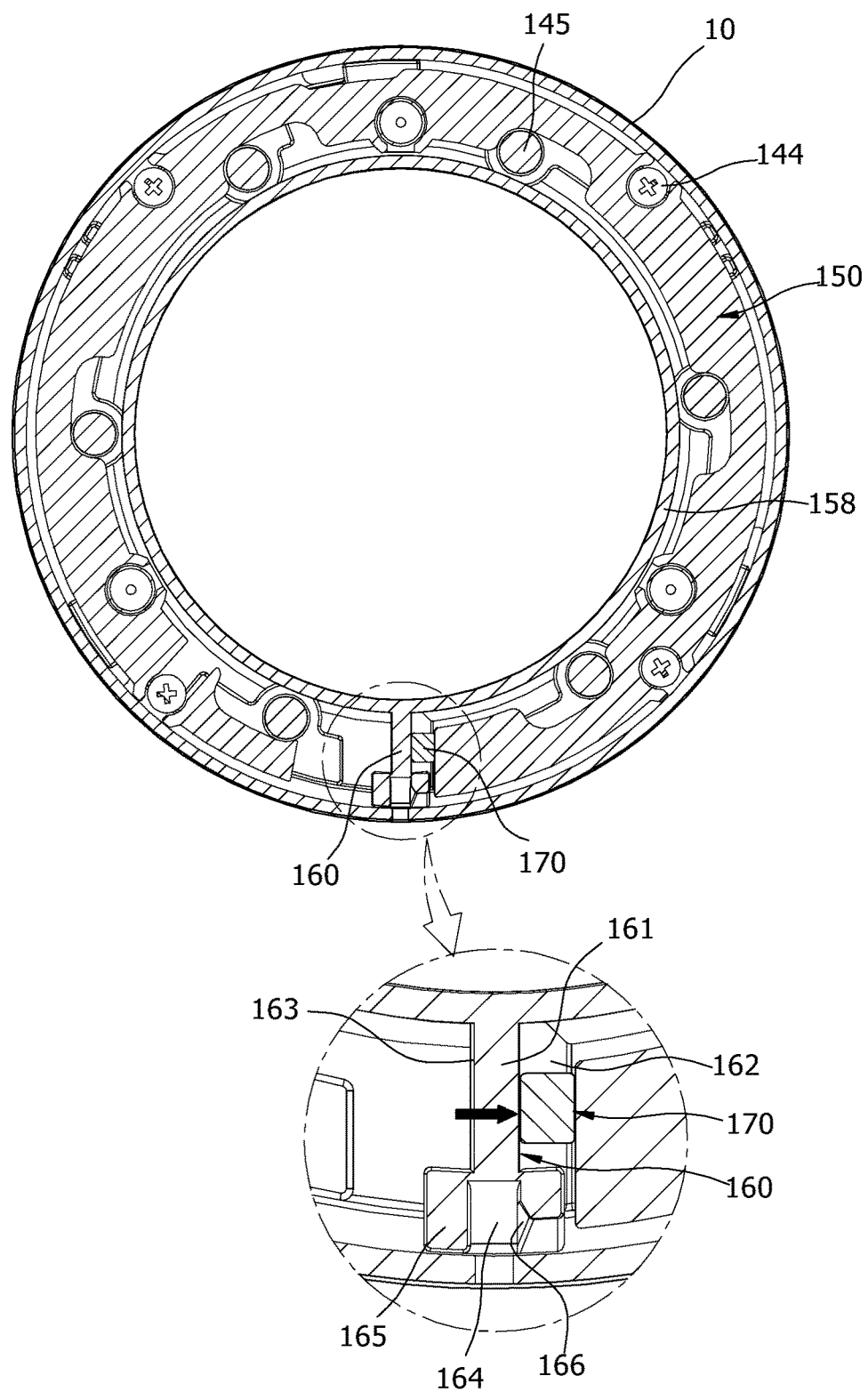
FIG. 22 is a rear view illustrating the state in which the locking part is released from the restriction part in the button device for an electronic device according to the first embodiment of the present invention.

FIG. 12 is an enlarged view illustrating a restriction part and a locking part in the button device for an electronic device according to the first embodiment of the present invention, and FIG. 13 is an enlarged view illustrating a state in which the locking part is restricted by the restriction part in the button device for an electronic device according to the first embodiment of the present invention. FIG. 14 is an enlarged view illustrating a state in which the rotation of the frame part is prevented as the locking part is restricted by the restriction part in the button device for an electronic device according to the first embodiment of the present invention, and FIG. 15 is an enlarged view illustrating a state in which the locking part is released from the restriction part as a key is inserted into the restriction part in the button device for an electronic device according to the first embodiment of the present invention. FIG. 16 is an enlarged view illustrating a state in which the locking part is moved to a release region as the frame part is rotated while the key is inserted into the restriction part in the button device for an electronic device according to the first embodiment of the present invention, and FIG. 17 is an enlarged view illustrating a state in which the key is removed from the restriction part in the button device for an electronic device according to the first embodiment of the present invention. FIG. 18 is a cross-sectional view illustrating a state before the key is inserted into the restriction part in the button device for an electronic device according to the first embodiment of the present invention, and FIG. 19 is an enlarged view illustrating a state in which the key is inserted into the restriction part in the button device for an electronic device according to the first embodiment of the present invention. FIG. 20 is an enlarged view illustrating a state in which the locking part is released from the restriction part as the key is inserted into the restriction part in the button device for an electronic device according to the first embodiment of the present invention, FIG. 21 is a rear view illustrating the state in which the locking part is restricted by the restriction part in the button device for an electronic device according to the first embodiment of the present invention, and FIG. 22 is a rear view illustrating the state in which the locking part is released from the restriction part in the button device for an electronic device according to the first embodiment of the present invention.

Referring to FIGS. 12 to 22, the button device 100 for an electronic device further includes a restriction part 160 disposed on the adhesive conductive part 150 to correspond to a keyhole part 115 of the frame part 110 and a locking part 170 which is formed on the support part 140 so that the locking part 170 is hooked on and restricted by the restriction part 160 and is released from the restriction part 160 as a key 20 is inserted into the keyhole part 115.

Since the locking part 170 of the support part 140 is hooked on and restricted by the restriction part 160 of the adhesive conductive part 150, the support part 140 and the frame part 110 can be prevented from being separated from the adhesive conductive part 150 while being rotated in a circumferential direction. In addition, as the key 20 is inserted into the keyhole part 115, since the locking part 170 is released from the restriction part 160, the frame part 110 and the support part 140 are rotated at a predetermined angle in the circumferential direction, and thus separation can be easily and rapidly performed. Accordingly, when components of the button device 100 are damaged or malfunctioned, some components can be easily and quickly replaced. In this case, a rotation angle of the frame part 110 and the support part 140 may be appropriately designed in consideration of a range in which the locking part 170 is restricted by and released from the restriction part 160.

A deformation limiting part 116 is formed to protrude from the frame part 110 to limit a range in which the support part 140 is deformed when the key 20 releases the restriction of the locking part 170. Accordingly, when the key 20 is fitted between the support part 140 and the restriction part 160 to push the support part 140 upward, the support part 140 is hooked on the deformation limiting part 116, and thus an amount of deformation is limited.

The restriction part 160 include a restriction step part 161 which corresponds to the keyhole part 115 and is formed to protrude from the adhesive conductive part 150 so that the locking part 170 is hooked on and restricted by the restriction step part 161 and a pair of anti-separation parts 165 formed to protrude at two sides of the restriction step part 161 to prevent separation of the key 20 when the key 20 is inserted into the keyhole part 115. When the key 20 is inserted into the keyhole part 115, since the pair of anti-separation parts 165 guide an entry direction of the key 20, the key 20 can be prevented from being separated from an upper surface of the restriction step part 161. In addition, when the key 20 is inserted into the keyhole part 115, since the key 20 moves along the upper surface of the restriction step part 161, the key 20 pushes the locking part 170 upward and releases the locking part 170 from the restriction step part 161. Accordingly, an operator can easily separate the frame part 110 and the support part 140 from the adhesive conductive part 150 by manipulating the key 20.

A tapered restriction part 162 is formed at one side of the restriction step part 161 in a width direction so that the locking part 170 is moved to an upper side of the restriction step part 161, and a restriction stepped part 163 is formed at the other side of the restriction step part 161 so that the locking part 170 is hooked on and restricted by the restriction stepped part 163. Accordingly, when the frame part 110 is rotated in one direction in a state in which the frame part 110 is seated at an upper side of the adhesive conductive part 150, the locking part 170 may be smoothly moved upward along the tapered restriction part 162. In addition, when the locking part 170 is moved to the other side of the restriction step part 161 in the width direction and then moved downward, the restriction stepped part 163 restricts the locking part 170 from moving in the other direction. Accordingly, even when an external force is applied to rotate the frame part 110 in the other direction, the frame part 110 is not separated from the adhesive conductive part 150.

A tapered insertion part 164 formed to be inclined upward toward the restriction step part 161 is formed between the pair of anti-separation parts 165. Accordingly, when the key 20 is inserted into the keyhole part 115, since the key 20 is moved upward along the tapered insertion part 164, the locking part 170 is released from the restriction stepped part 163 as the support part 140 is pushed and moved upward by the key 20.

A tapered movement part 166 is formed on the anti-separation part 165 so that the key 20 is moved while being inserted into the keyhole part 115. Among the pair of anti-separation parts 165, the tapered movement part 166 is formed on the anti-separation part 165 disposed in a direction in which the locking part 170 is released. Accordingly, when the frame part 110 is rotated at a predetermined angle in the other direction in a state in which the key 20 is inserted into the keyhole part 115, the key 20 can be smoothly moved in the tapered movement part 166 while sliding.

The locking part 170 is disposed to avoid the key 20 when the key 20 is inserted into the keyhole part 115. Accordingly, the locking part 170 can be prevented from being hooked on the key 20 when the key 20 is inserted into the keyhole part 115.

A tapered locking part 171 is formed at the other side of the locking part 170 to move along the tapered restriction part 162, and a locking stepped part 173 is formed at one side of the locking part 170 to be hooked on and restricted by the restriction stepped part 163. Accordingly, in a state in which the locking part 170 is released from the restriction step part 161, the tapered locking part 171 is in contact with the tapered restriction part 162, and in a state in which the locking part 170 is restricted by the restriction step part 161, the locking stepped part 173 is in contact with the restriction stepped part 163.

Then, a button device for an electronic device according to a second embodiment of the present invention will be described.

Figure 23:
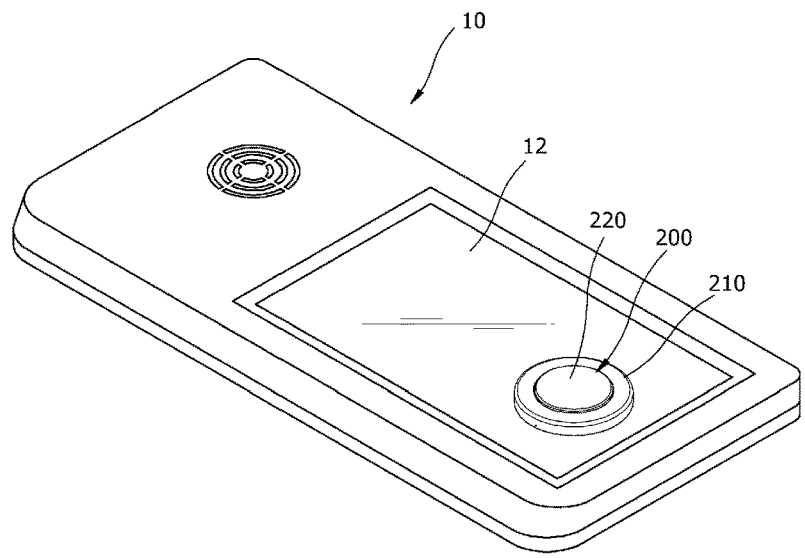
FIG. 23 is a perspective view illustrating a state in which a button device for an electronic device is bonded to a touch panel unit according to a second embodiment of the present invention.
Figure 24:
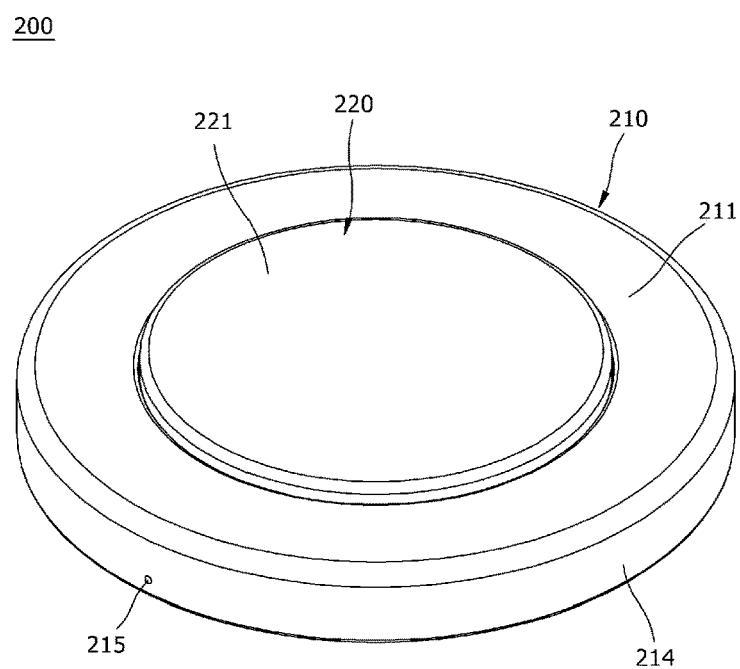
FIG. 24 is a perspective view illustrating the button device for an electronic device according to the second embodiment of the present invention.
Figure 25:
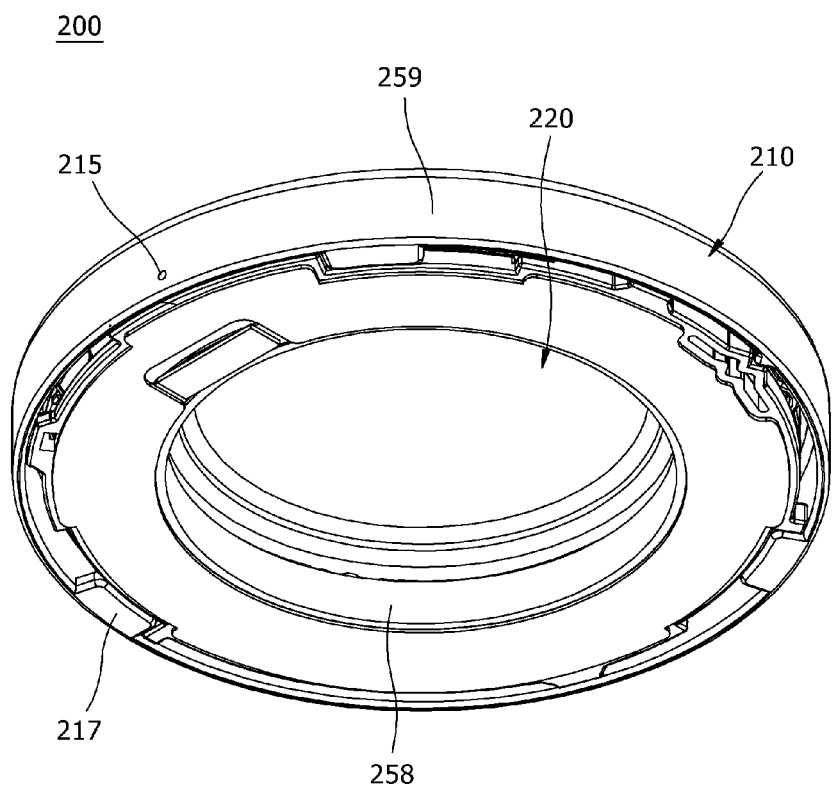
FIG. 25 is a bottom perspective view illustrating the button device for an electronic device according to the second embodiment of the present invention.
Figure 26:
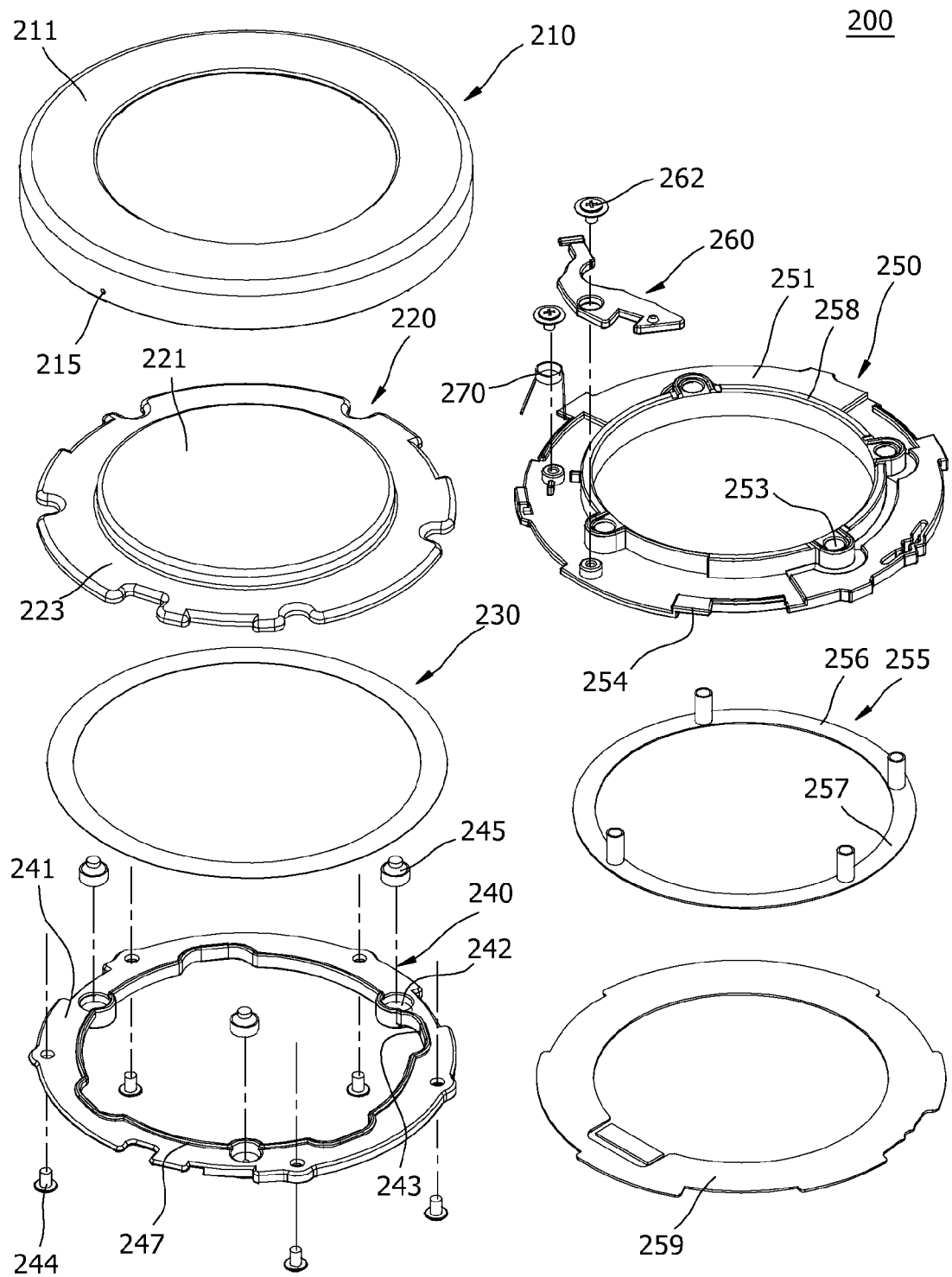
FIG. 26 is an exploded perspective view illustrating the button device for an electronic device according to the second embodiment of the present invention.
Figure 27:
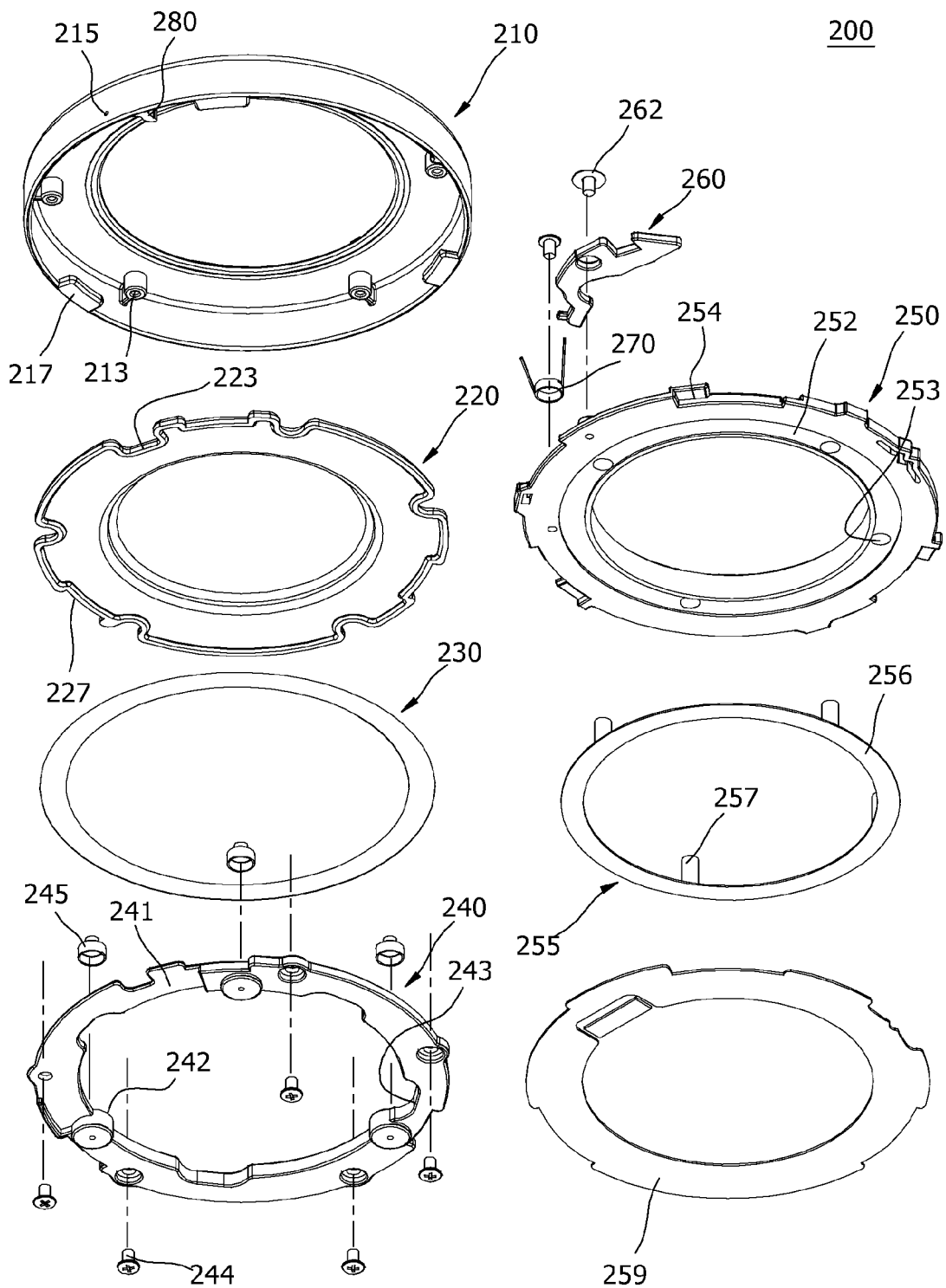
FIG. 27 is an exploded bottom perspective view illustrating the button device for an electronic device according to the second embodiment of the present invention.
Figure 28:
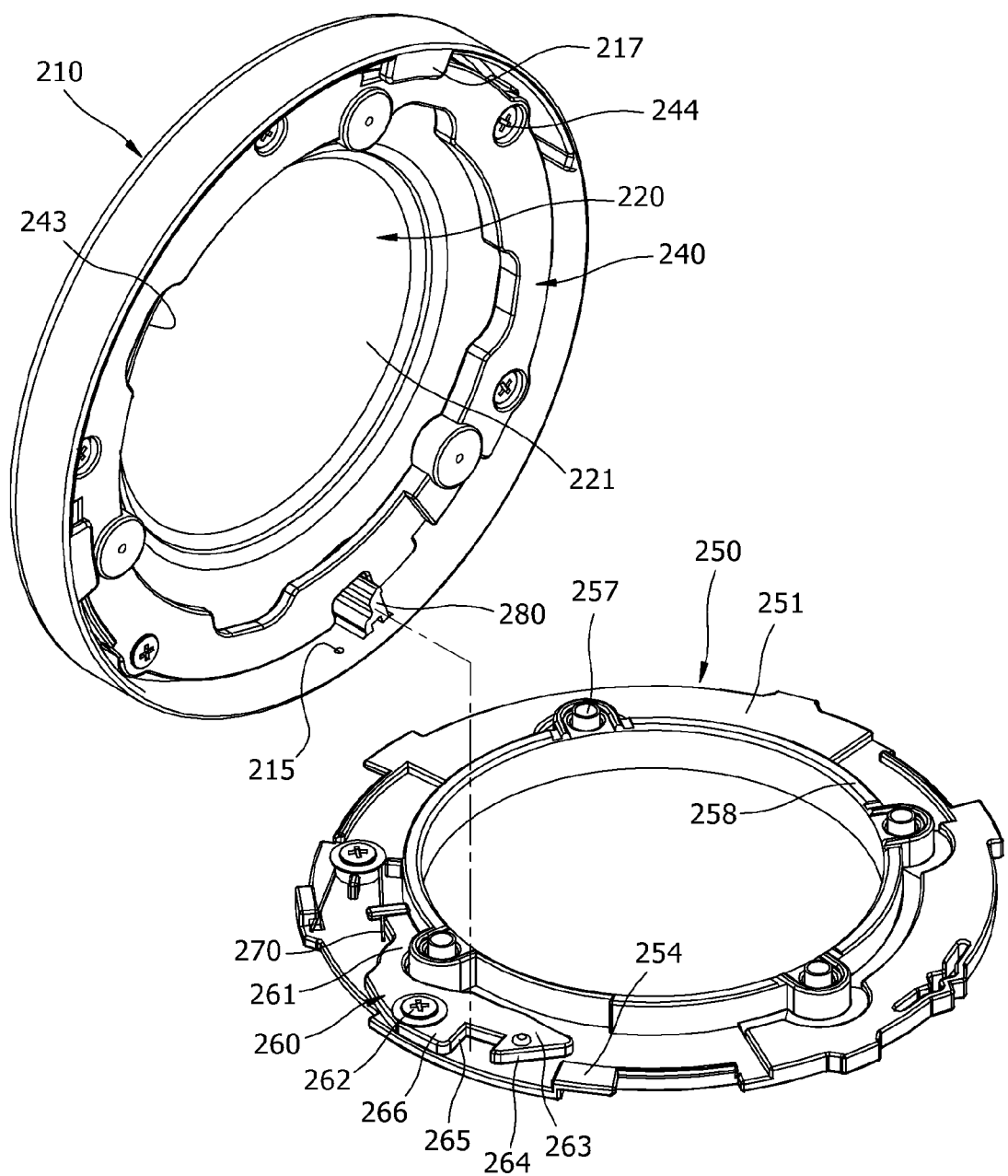
FIG. 28 is a perspective view illustrating a state in which an adhesive conductive part and a frame part are separated in the button device for an electronic device according to the second embodiment of the present invention.

FIG. 23 is a perspective view illustrating a state in which a button device for an electronic device is bonded to a touch panel unit according to the second embodiment of the present invention, and FIG. 24 is a perspective view illustrating the button device for an electronic device according to the second embodiment of the present invention. FIG. 25 is a bottom perspective view illustrating the button device for an electronic device according to the second embodiment of the present invention, and FIG. 26 is an exploded perspective view illustrating the button device for an electronic device according to the second embodiment of the present invention. FIG. 27 is an exploded bottom perspective view illustrating the button device for an electronic device according to the second embodiment of the present invention, and FIG. 28 is a perspective view illustrating a state in which an adhesive conductive part and a frame part are separated in the button device for an electronic device according to the second embodiment of the present invention.

Referring to FIGS. 23 to 28, a button device 200 for an electronic device according to the second embodiment of the present invention includes a frame part 210, a button part 220, an inner conductive part 230, a support part 240, and an adhesive conductive part 250. An electronic device 10 according to the second embodiment of the present invention includes any device such as a casino machine and an entertainment machine.

A touch panel unit 12 is installed on the electronic device 10. The touch panel unit 12 includes a circuit board (not shown), a touch film part 14 stacked on the circuit board, and a glass part 13 stacked on the touch film part 14. The circuit board includes a liquid crystal display (not shown) and a control unit (not shown). In the touch film part 14, touch detection lines (not shown) are wired to intersect in vertical and horizontal directions. The glass part 13 may be formed of a transparent glass or synthetic resin material.

The frame part 210 includes a conductive material. In this case, the frame part 210 may be entirely formed of a conductive material, or a plating layer may be formed on a surface of a synthetic resin of the frame part 210. Since the frame part 210 includes the conductive material, the electrostatic capacitance of the frame part 210 can be increased. The electrostatic capacitance increases in proportion to the area of the frame part 210 and the permittivity of the conductive material. The frame part 210 may be entirely formed in a circular shape, an elliptic shape, or a polygonal shape.

The button part 220 is movably coupled to the frame part 210. The button part 220 may be formed in a shape that is the same as or similar to the shape of the frame part 210. The button part 220 may be formed of a synthetic resin material.

The inner conductive part 230 is disposed in the button part 220 to move with the button part 220 and receives electrostatic energy caused by the electrostatic capacitance of the frame part 210. The inner conductive part 230 is disposed under the frame part 210 so that the inner conductive part 230 is not visible from the outside. The inner conductive part 230 may be formed in a shape that is the same as or similar to the shape of the frame part 210. In addition, the inner conductive part 230 may be entirely formed of a conductive material, or may be manufactured of a mixed material of a synthetic resin material such as silicone and a conductive powder. An outer surface of the inner conductive part 230 may be installed to be spaced approximately 1 to 3 mm from an inner surface of a circumferential portion of the frame part 210.

The support part 240 is coupled to the frame part 210 to elastically support the button part 220. The support part 240 may be formed of a flexible synthetic resin material. The support part 240 may be entirely formed in an annular frame shape, an elliptic frame shape, or a polygonal frame shape.

The adhesive conductive part 250 is coupled to the frame part 210, is bonded to the touch panel unit 12, and comes into contact with the inner conductive part 230 to transfer the electrostatic energy of the inner conductive part 230 to the touch panel unit 12 when the button part 220 moves. As the adhesive conductive part 250 is bonded to the touch panel unit 12 and the button part 220 is moved downward by an external force, electrostatic energy caused by electrostatic capacitance is transferred to the touch film part 14 of the touch panel unit 12 through the frame part 210, the inner conductive part 230, and the adhesive conductive part 250. Accordingly, as a user operates the button device 200 for an electronic device, a function of the electronic device 10 may be input and selected.

Since the adhesive conductive part 250 is bonded to the touch panel unit 12, a wire passage hole or button mounting hole does not need to be formed in the glass part 13. Accordingly, degradation of the rigidity of the glass part 13 can be prevented, and the glass part 13 can be prevented from cracking caused by an impact or external force. In addition, since a thickness of the glass part 13 does not need to be increased to reinforce the rigidity of the glass part 13, the manufacturing costs of the glass part 13 can be reduced, and a touch sensation can be improved as the thickness of the glass part 13 is reduced.

In addition, since the external moisture and water are prevented from entering the glass part 13, a malfunction of or damage to the touch panel unit 12 or the electronic device 10 can be prevented.

In addition, since a separate screw or latch part does not need to be installed to fix the button device 200 to the touch panel unit 12, an installation structure of the button device 200 can be simplified and manufacturing costs can be significantly reduced. In addition, when the glass part 13 or the button device 200 is disassembled or assembled, since a screw or latch part does not need to be released, the disassembly and assembly time and repair cost of the glass part 13 or the button device 200 can be significantly reduced.

The button part 220 includes a button body part 221 and a button flange part 223. The button body part 221 is inserted into a frame hole part 212 of the frame part 210. The button flange part 223 is formed on a circumferential portion of the button body part 221 to be hooked on the frame part 210, and the inner conductive part 230 is disposed on the button flange part 223. Since the button flange part 223 is formed in an annular shape to be hooked on the frame flange part 214, the button part 220 can be prevented from being separated from the frame flange part 214 even when moved upward by an elastic force of the support part 240.

The button part 220 is formed of a transparent material. The button part 220 may be formed of a transparent acrylic or silicone material. Accordingly, the user can visually check an image of the touch panel unit 12 through the button part 220.

The inner conductive part 230 is formed in a ring shape to be attached to the button flange part 223. The inner conductive part 230 is installed to avoid the button body part 221. The inner conductive part 230 may be directly attached to a lower surface of the button flange part 223 using a conductive adhesive.

The adhesive conductive part 250 includes an adhesive base part 251 and one or more conductive members 255.

The adhesive base part 251 is bonded to the touch panel unit 12. The adhesive base part 251 may be formed in an annular shape or a similar shape thereto. The adhesive base part 251 may be formed of a flexible synthetic resin material. The adhesive base part 251 is bonded to the touch panel unit 12 using an adhesive member 259 such as a conductive adhesive or conductive tape.

The conductive member 255 is coupled to the adhesive base part 251 to be in contact with the touch panel unit 12 and comes into contact with the inner conductive part 230 to transfer the electrostatic energy of the inner conductive part 230 to the touch panel unit 12 when the button part 220 moves. The conductive member 255 may be formed of a mixed material of a synthetic resin material and a conductive powder or of a metallic material. Since the conductive member 255 constitutes a part of the adhesive conductive part 250, the manufacturing costs of the adhesive conductive part 250 can be reduced compared to a component which is entirely formed of a conductive material. In addition, when the number of installed conductive members 255 is increased, a facing area between the conductive members 255 and a contact area of the touch detection lines is significantly increased in the touch panel unit 12. Accordingly, since the transfer area of electrostatic energy caused by electrostatic capacitance is significantly increased, the electrostatic energy can be stably transferred to the touch panel unit 12 no matter which side of the button part 220 is obliquely pressed.

Figure 29:
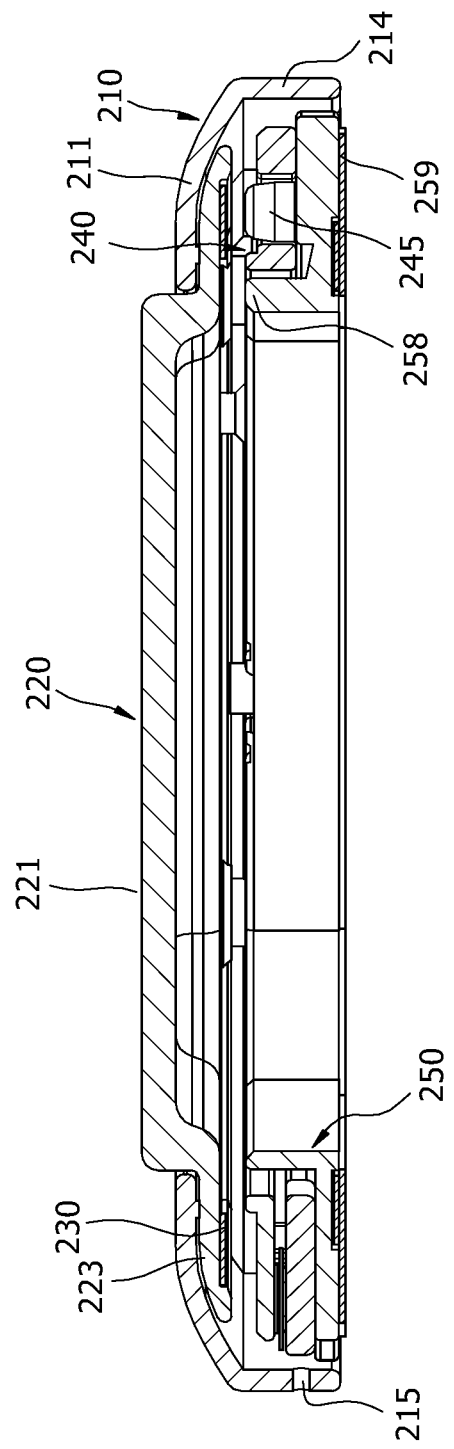
FIG. 29 is a cross-sectional view illustrating the button device for an electronic device according to the second embodiment of the present invention.
Figure 30:
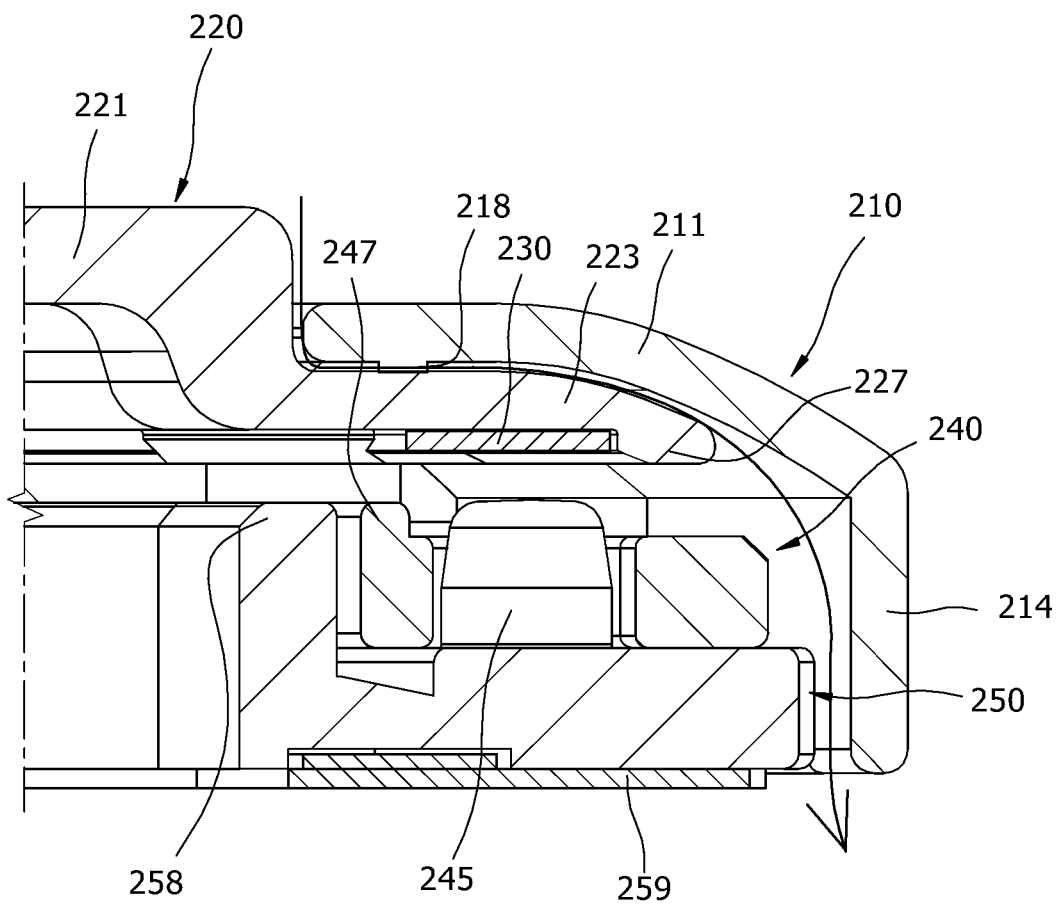
FIG. 30 is an enlarged view illustrating a state in which water is drained while a button part is not pressed in the button device for an electronic device according to the second embodiment of the present invention.
Figure 31:
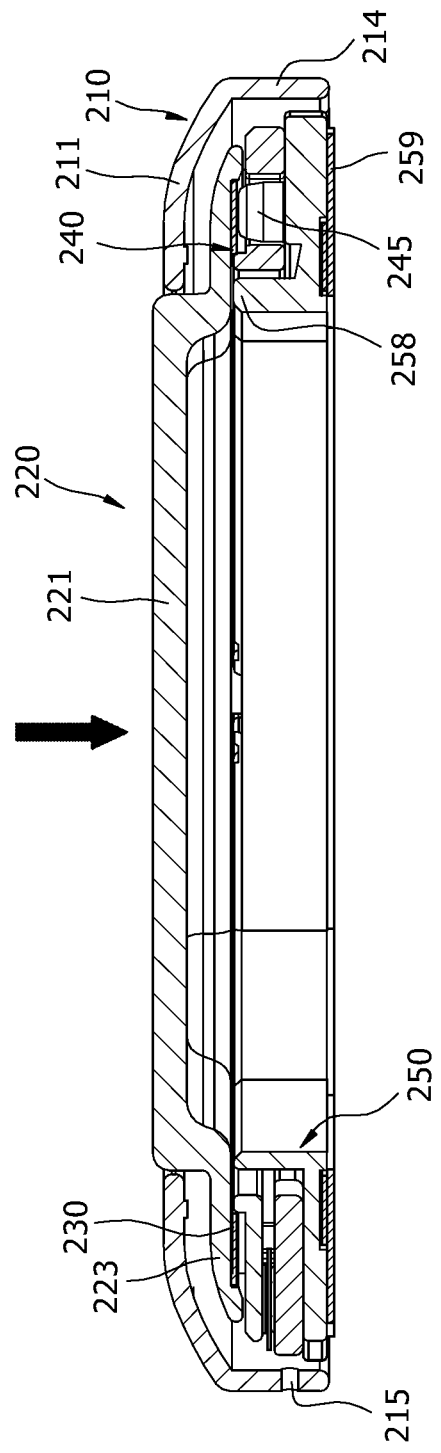
FIG. 31 is a cross-sectional view illustrating a state in which the button part is pressed in the button device for an electronic device according to the second embodiment of the present invention.
Figure 32:
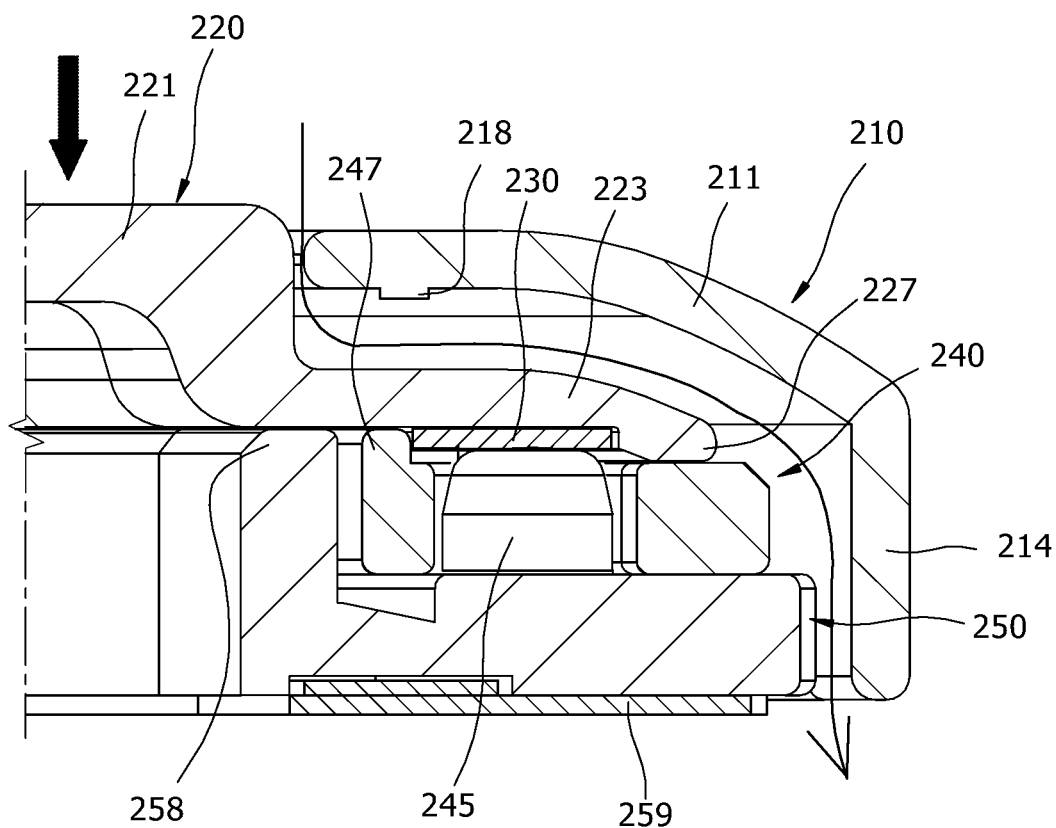
FIG. 32 is an enlarged view illustrating a state in which water is drained while the button part is pressed in the button device for an electronic device according to the second embodiment of the present invention.

FIG. 29 is a cross-sectional view illustrating the button device for an electronic device according to the second embodiment of the present invention, and FIG. 30 is an enlarged view illustrating a state in which water is drained while a button part is not pressed in the button device for an electronic device according to the second embodiment of the present invention. FIG. 31 is a cross-sectional view illustrating a state in which the button part is pressed in the button device for an electronic device according to the second embodiment of the present invention, and FIG. 32 is an enlarged view illustrating a state in which water is drained while the button part is pressed in the button device for an electronic device according to the second embodiment of the present invention.

Referring to FIGS. 29 to 32, the conductive member 255 includes a conductive rod part 256 coupled to the adhesive base part 251 to be in contact with the touch panel unit 12 and a conductive protrusion 257 formed to protrude from the conductive rod part 256 to pass through the adhesive base part 251 and come into contact with the inner conductive part 230. The conductive rod part 256 is installed in a circumferential direction of the adhesive base part 251, and the conductive protrusion 257 may be formed as a plurality of conductive protrusions 257 on the conductive rod part 256. The conductive rod part 256 may be formed in an annular shape or formed of a plurality of conductive pieces. As the conductive protrusion 257 comes into contact with the inner conductive part 230, the electrostatic energy of the frame part 210 is transferred to the conductive protrusion 257 through the inner conductive part 230, and the conductive protrusion 257 transfers the electrostatic energy to the touch panel unit 12 through the conductive rod part 256.

The adhesive base part 251 includes a seating part 252 formed to be recessed in the adhesive base part 251 so that the conductive rod part 256 is seated on the seating part 252 and a connecting hole part 253 formed in the seating part 252 so that the conductive protrusion 257 passes through the connecting hole part 253. An upper end portion of the conductive protrusion 257 is exposed to an upper side of the adhesive base part 251 through the connecting hole part 253.

The support part 240 includes a support body part 241 facing the inner conductive part 230 and coupled to the frame part 210 and an elastic member 245 installed on the support body part 241 to elastically support the button part 220. The support body part 241 is formed in an annular shape to correspond to the button flange part 223 of the button part 220. The support body part 241 is disposed to avoid the button body part 221. The elastic member 245 may be formed in a cylindrical or conical shape to be contracted in a longitudinal direction by a pressing force of the button part 220. The elastic member 245 may be formed of a synthetic resin material.

A plurality of coupling members 244 are installed in the support body part 241 to pass through the support body part 241, and a plurality of boss parts 213 are formed on an inner surface of the frame part 210 to be coupled to the plurality of coupling members 244. Accordingly, the support body part 241 can support the button part 220 and the inner conductive part 230 so that the button part 220 and the inner conductive part 230 are not separated from the frame part 210.

In the support body part 241, a plurality of exposed groove parts 243 are formed to be recessed so that the conductive protrusions 257 pass through the plurality of exposed groove parts 243. Since the conductive protrusions 257 pass through the exposed groove parts 243, even when the support body part 241 is disposed between the inner conductive part 230 and the adhesive base part 251, the inner conductive part 230 may come into contact with the conductive protrusion 257 as the inner conductive part 230 moves downward when the button part 220 is pressed.

The frame part 210 includes a frame body part 211, a frame flange part 214, and a plurality of sliding restriction parts 217.

The frame body part 211 is formed in an annular shape to surround an outer side of the button part 220, the inner conductive part 230, and the support part 240. The frame flange part 214 is formed in an annular shape along a circumferential portion of the frame body part 211. The frame flange part 214 extends downward from the frame body part 211. The plurality of sliding restriction parts 217 are formed to protrude from the frame flange part 214 to be hooked on and restricted by holder parts 254 of the adhesive conductive part 250. The sliding restriction parts 217 extend inward from the frame flange part 214. Each of the holder parts 254 of the adhesive conductive part 250 may be formed in a "r" shape in which an upper side and one side are closed. The plurality of holder parts 254 are formed along a circumferential portion of the adhesive conductive part 250. Accordingly, when the frame part 210 is seated on an upper side of the adhesive conductive part 250 and then rotated at a predetermined angle, the sliding restriction parts 217 are fitted into the holder parts 254 of the adhesive conductive part 250, and thus the frame part 210 can be prevented from being separated upward from the touch panel unit 12.

A circumferential portion of the button flange part 223 and a circumferential portion of the support part 240 are formed to be tapered or rounded, and a circumferential portion of the adhesive base part 251 is disposed further outward than the circumferential portion of the button flange part 223 and the circumferential portion of the support part 240.

A first waterproofing protrusion 218 is formed to protrude downward from the circumferential portion of the frame part 210, and a second waterproofing protrusion 227 is formed to protrude downward from the circumferential portion of the button part 220. In this case, the first waterproofing protrusion 218 is formed in an annular shape or a similar shape thereto on an outer surface of the frame flange part 214 in a circumferential direction (see FIG. 5). In addition, the second waterproofing protrusion 227 is formed in an annular shape or a shape similar thereto in a circumferential direction of the button flange part 223.

When the button part 220 is not pressed, since the first waterproofing protrusion 218 is in close contact with an upper surface of the button flange part 223, most external moisture or water is blocked from flowing into the button part 220 and the adhesive conductive part 250 by the first waterproofing protrusion 218. In addition, moisture or water entering through the first waterproofing protrusion 218 flows along the circumferential portion of the button flange part 223 and the circumferential portion of the support part 140 and drains outside of the frame part 210.

In addition, when the button part 220 is pressed, even when external moisture or water flows through a gap between the frame part 210 and the button part 220, the external moisture or water flows along the circumferential portion of the button flange part 223 and the circumferential portion of the support part 240 and drains outside of the frame part 210. In addition, since the second waterproofing protrusion 227 of the button flange part 223 is in close contact with the upper surface of the circumferential part of the support part 240, external moisture or water can be blocked from flowing into the button part 220 and the adhesive conductive part 250 by the second waterproofing protrusion 227.

In the adhesive conductive part 250, a third waterproofing protrusion 258 is formed to protrude upward (see FIG. 7). The third waterproofing protrusion 258 is formed inside the adhesive base part 251 and formed in an annular shape in a circumferential direction.

Accordingly, moisture or water entering or being introduced into the button part 220 may be blocked from flowing into the adhesive conductive part 250 regardless of whether the button part 220 is pressed.

In the support part 240, a fourth waterproofing protrusion 247 is formed to protrude upward (see FIGS. 26 and 30). The fourth waterproofing protrusion 247 is formed in an annular shape on an inner side or outer side of the support part 240 in a circumferential direction. Accordingly, the fourth waterproofing protrusion 247 can block moisture or water entering or being introduced into the button part 220 from flowing into the adhesive conductive part 250 regardless of whether the button part 220 is pressed.

Since the first waterproofing protrusion 218, the second waterproofing protrusion 227, the third waterproofing protrusion 258, and the fourth waterproofing protrusion 247 guide moisture or water to drain naturally, the moisture or water can be prevented from staying inside the button device 200 for an electronic device. In addition, a malfunction of the button device 200 for an electronic device due to moisture or water entering the frame part 210, the inner conductive part 230, and the adhesive conductive part 250 can be prevented.

Figure 33:
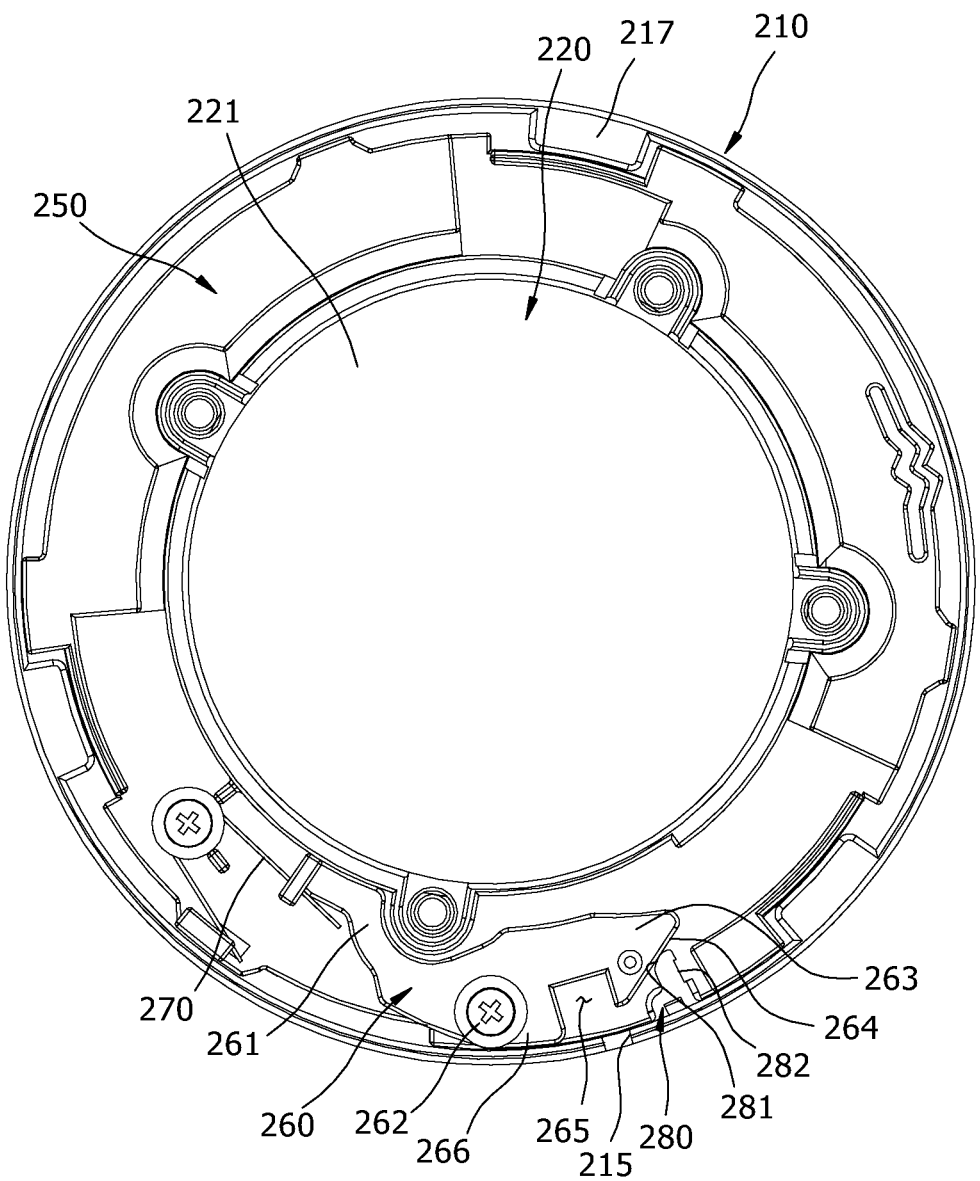
FIG. 33 is a rear view illustrating a restriction part and a restriction lever part in the button device for an electronic device according to the second embodiment of the present invention.
Figure 34:
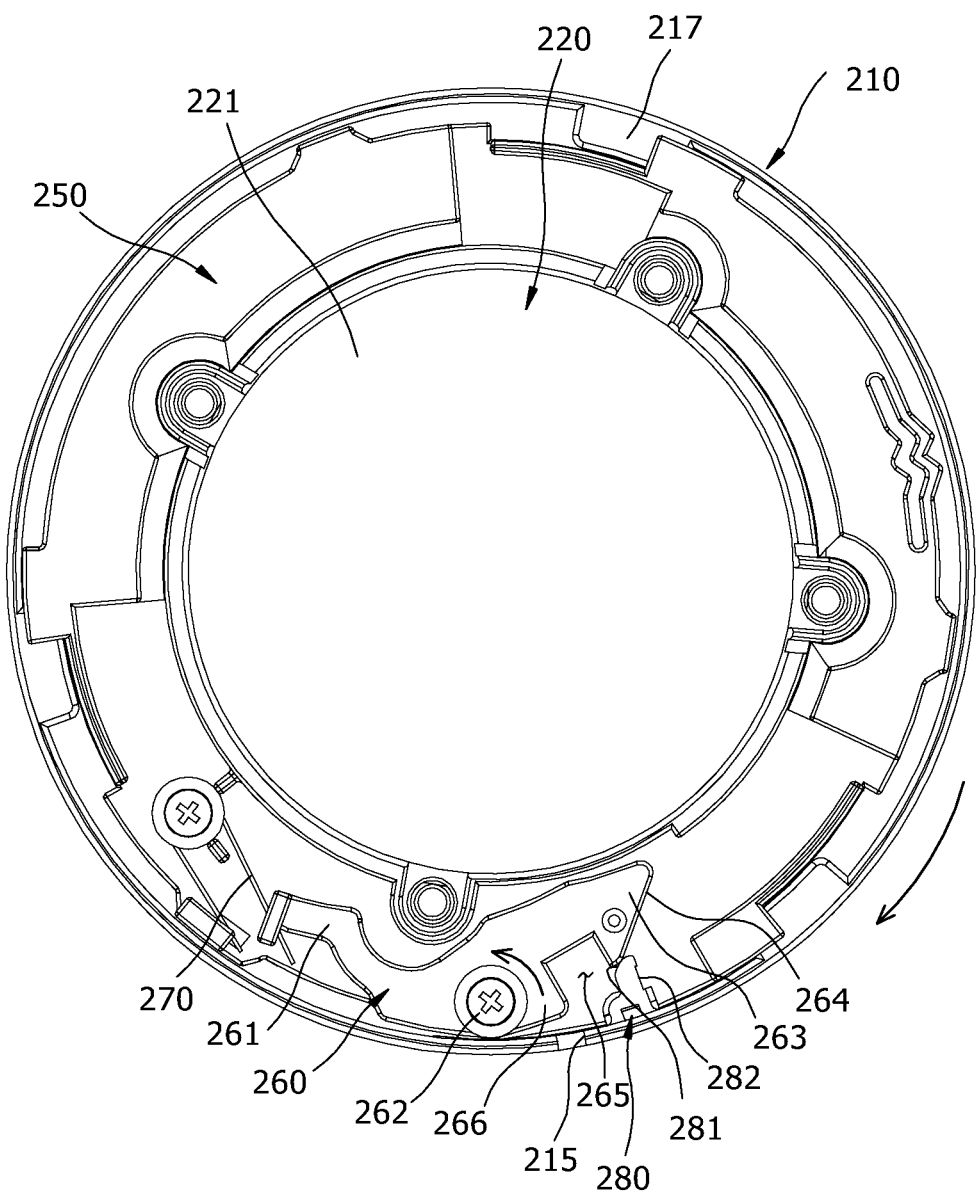
FIG. 34 is a rear view illustrating a state in which a locking part is moved while pressing a hook part of the restriction lever part in the button device for an electronic device according to the second embodiment of the present invention.
Figure 35:
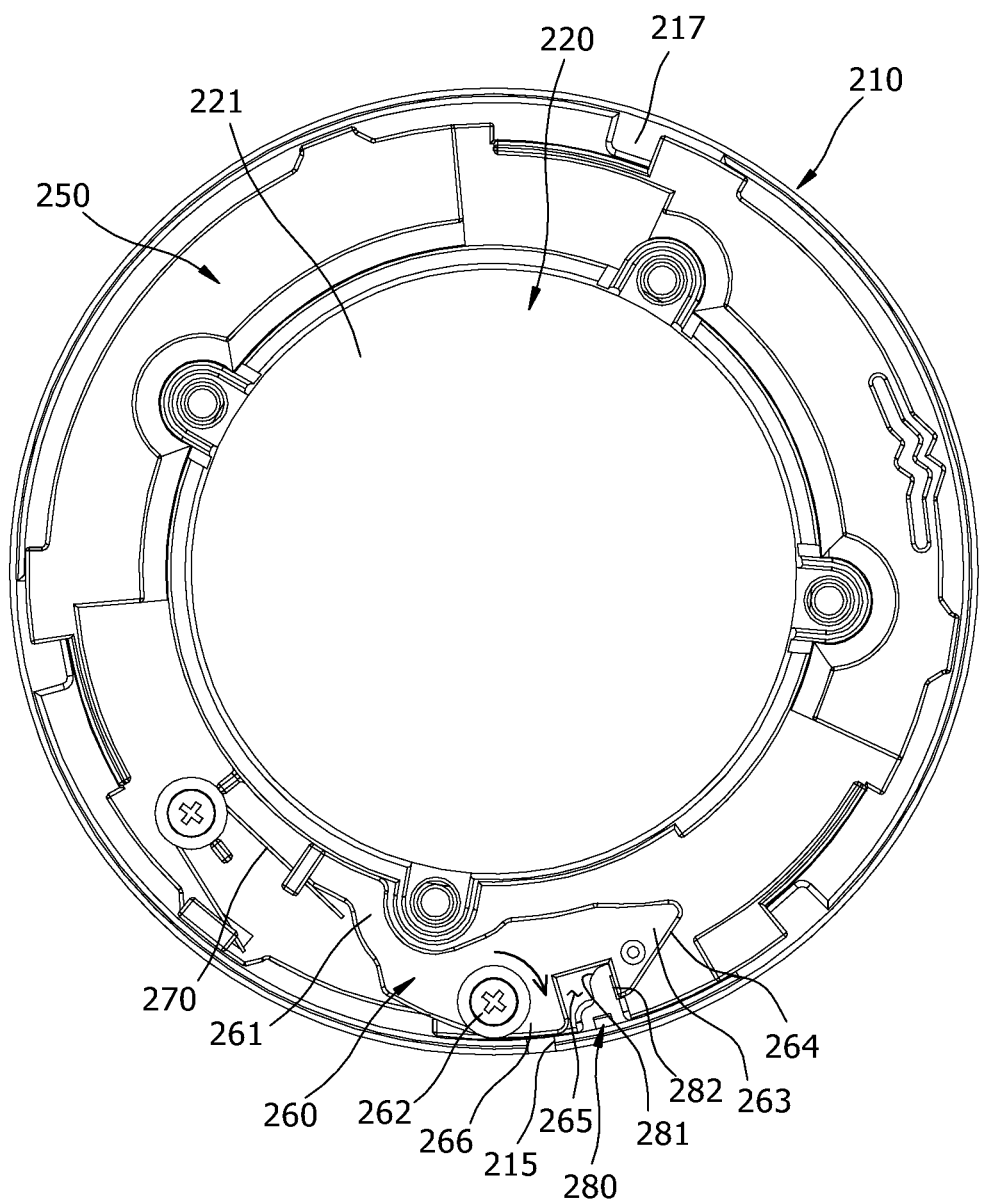
FIG. 35 is an enlarged view illustrating a state in which the locking part is restricted by the restriction lever part in the button device for an electronic device according to the second embodiment of the present invention.
Figure 36:
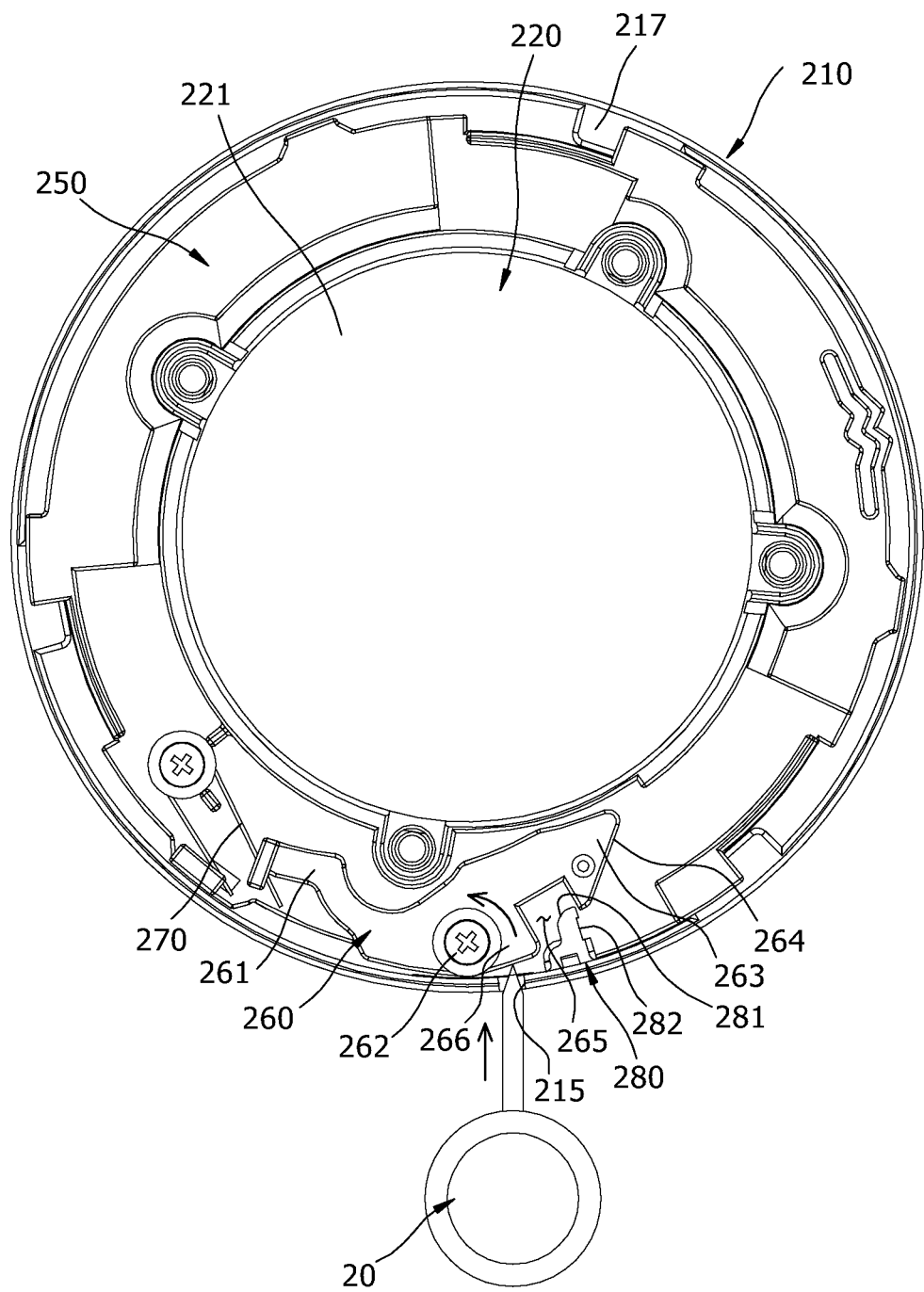
FIG. 36 is an enlarged view illustrating a state in which the locking part is released from the restriction lever part as a key is inserted into the restriction part in the button device for an electronic device according to the second embodiment of the present invention.
Figure 37:
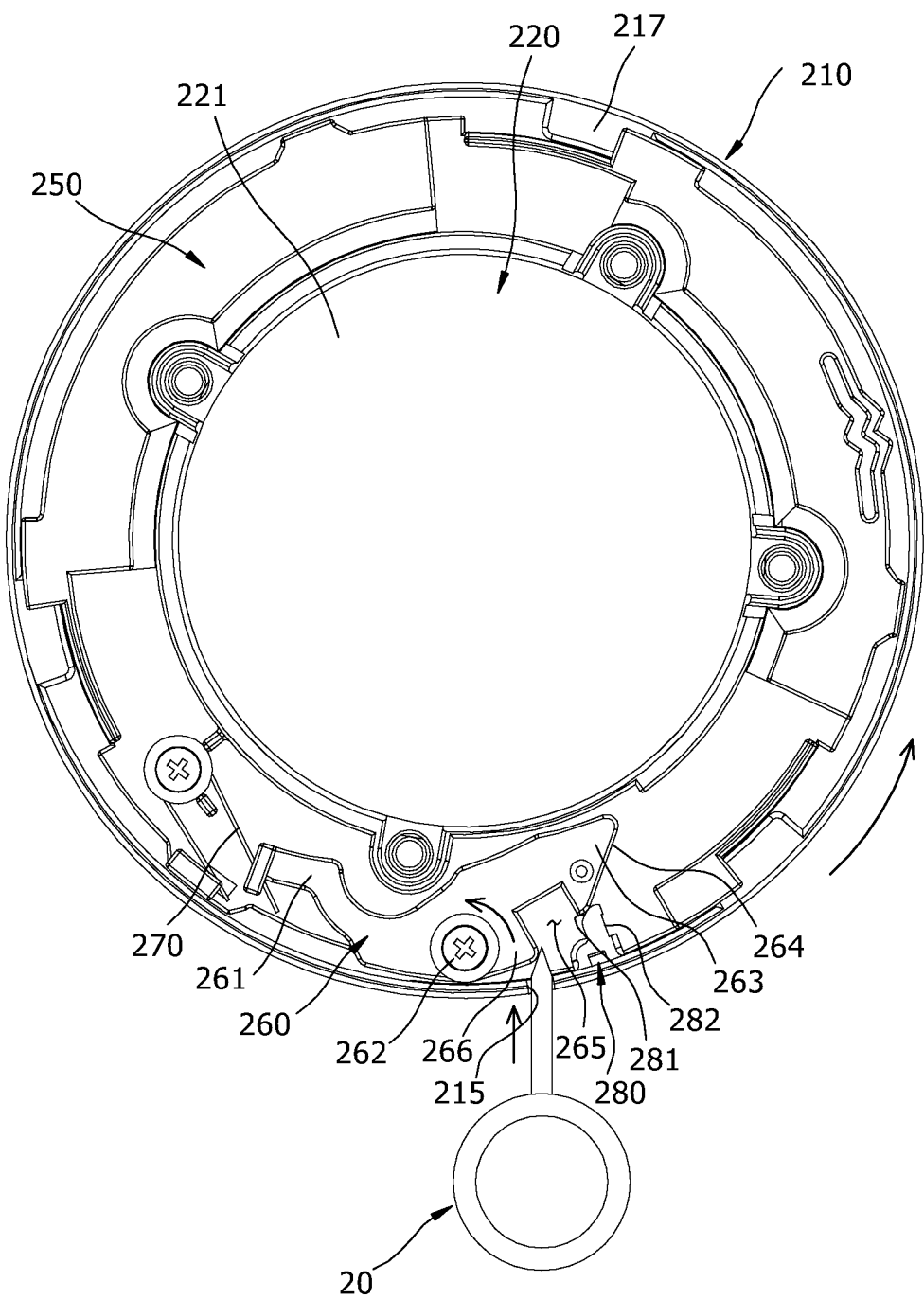
FIG. 37 is a rear view illustrating a state in which the locking part is moved to a release region as the frame part is rotated while the key presses the restriction lever part in the button device for an electronic device according to the second embodiment of the present invention.

FIG. 33 is a rear view illustrating a restriction part and a restriction lever part in the button device for an electronic device according to the second embodiment of the present invention, and FIG. 34 is a rear view illustrating a state in which a locking part is moved while pressing a hook part of the restriction lever part in the button device for an electronic device according to the second embodiment of the present invention. FIG. 35 is an enlarged view illustrating a state in which the locking part is restricted by the restriction lever part in the button device for an electronic device according to the second embodiment of the present invention, and FIG. 36 is an enlarged view illustrating a state in which the locking part is released from the restriction lever part as a key is inserted into the restriction part in the button device for an electronic device according to the second embodiment of the present invention. FIG. 37 is a rear view illustrating a state in which the locking part is moved to a release region as the frame part is rotated while the key presses the restriction lever part in the button device for an electronic device according to the second embodiment of the present invention.

Referring to FIGS. 33 to 37, the button device 200 for an electronic device includes a restriction lever part 260, an elastic restriction part 270, and a locking part 280.

The restriction lever part 260 is rotatably installed on the adhesive conductive part 250 to correspond to a keyhole part 215 of the frame part 210. The elastic restriction part 270 is connected to the restriction lever part 260 to apply an elastic force to the restriction lever part 260. The locking part 280 is hooked on and restricted by the restriction lever part 260 and released from the restriction lever part 260 as the locking part 280 is pressed by the key 20 inserted into the keyhole part 215.

The restriction lever part 260 includes a lever body part 261 disposed on the adhesive conductive part 250 and connected to the elastic restriction part 270, a hinge shaft part 262 installed on the adhesive conductive part 250 so that the lever body part 261 is rotated, and a hook part 263 formed on the lever body part 261 so that the locking part 280 hooked on and restricted by the hook part 263. When the lever body part 261 is pressed by the key 20, the hook part 263 releases the restriction of the locking part 280 as the lever body part 261 rotates. In addition, when the lever body part 261 is not pressed by the key 20, the lever body part 261 returns to an original position.

The hook part 263 is formed at one side of the lever body part 261, and the elastic restriction part 270 is connected to the other side of the lever body part 261. Accordingly, when the key 20 presses the lever body part 261 while being inserted into the keyhole part 215, the lever body part 261 presses the elastic restriction part 270 while rotating. In addition, when the key 20 does not press the lever body part 261, the lever body part 261 returns to the original position by an elastic force of the elastic restriction part 270.

The restriction lever part 260 further includes a pressing target part 266 formed on the lever body part 261 to correspond to the keyhole part 115. Accordingly, when the key 20 is inserted into the keyhole part 215 and then presses the pressing target part 266, the restriction lever part 260 is rotated about the hinge shaft part 262 to release the restriction of the locking part 280.

The hook part 263 includes a tapered hook part 264 formed on the lever body part 261 so that the locking part 280 moves while sliding and a hook groove part 265 formed between the tapered hook part 264 and the hinge shaft part 262 so that the locking part 280 is hooked on and restricted by the hook groove part 265. Accordingly, when the frame part 210 is restricted by the adhesive conductive part 250 while rotating at a predetermined angle, the locking part 280 may be smoothly moved along the tapered hook part 264 and then introduced into the hook groove part 265.

A tapered locking part 281 is formed at one side of the locking part 280 to move along the tapered hook part 264. Accordingly, when the frame part 210 is restricted by the adhesive conductive part 250 while rotating at a predetermined angle, the tapered locking part 281 may be smoothly moved along the tapered hook part 264.

A concave part 282 is formed at the other side of the locking part 280 to reduce a contact area with one side of the hook groove part 265. Accordingly, when the locking part 280 is moved along the tapered hook part 264 and then inserted into a hook groove, one side surface of the hook groove part 265 may be prevented from coming into contact with the concave part 282 of the locking part 280. Accordingly, friction between the locking part 280 and the one side surface of the hook groove part 265 may be prevented.

Figure 38:
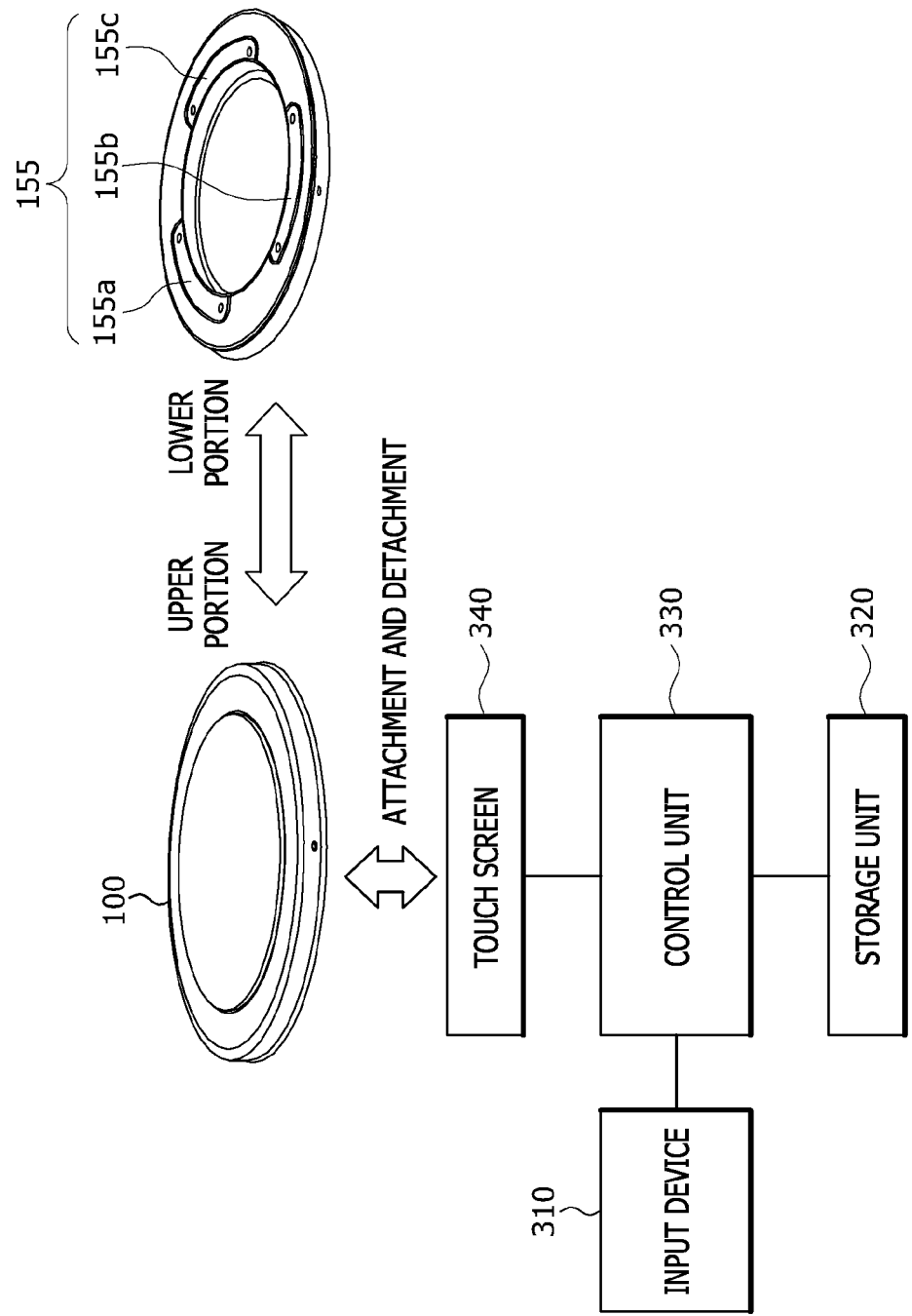
FIG. 38 is an exemplary schematic view illustrating a configuration of a capacitive button interface device according to one embodiment of the present invention.

FIG. 38 is an exemplary schematic view illustrating a configuration of a capacitive button interface device according to one embodiment of the present invention.

As illustrated in FIG. 38, a capacitive button interface device according to the present embodiment may be implemented in a form included in a computing device and includes an input device 310, a storage unit 320, a control unit 330, and a touch screen 340, and a button device 100 (hereinafter, may be described as a capacitive button in the present embodiment) is detachably attached to an upper surface of the touch screen 340.

The capacitive button 100 may be attached to the upper surface of the touch screen 340 using an adhesive, a double sided tape, or an adsorption member such as adsorption rubber or an adsorption pad on a rear surface (or back surface) and may also be relatively easily removed compared to a fixed type using a screw.

A plurality of conductive members 155 (155a to 155c) (hereinafter, may be described as capacitive contact points in the present embodiment) are formed on the rear surface of the capacitive button 100, and as a user presses a button part 120, the plurality of capacitive contact points 155 (155a to 155c) protrude at the same time and come into contact with the upper surface of the touch screen 340. In addition, as the user releases the pressurization from the button part 120, the plurality of capacitive contact points 155 (155a to 155c) are detached from the upper surface of the touch screen 340 at the same time.

In this case, the button part 120 is formed of a transparent material, and thus the user can check information displayed on the touch screen 340.

In this case, each of a shape of an exterior of the capacitive button 100 and a shape of an exterior of the button part 120 is exemplarily illustrated as a circular shape in the present embodiment but may be implemented as any shape such as a triangular shape, a quadrangular shape, a pentagonal shape, or the like regardless of a form. In addition, each of the shapes of the plurality of capacitive contact points 155 (155a to 155c) formed on the rear surface of the capacitive button 100 may be formed in any shape regardless of any one form, and distances between the capacitive contact points 155 (155a to 155c) and the number of capacitive contact points 155 (155a to 155c) may be variously implemented. For example, even when a shape of an exterior of the capacitive button 100 is formed in the circular shape as in the present embodiment, the overall size of the capacitive button 100 and the shape and the number of capacitive contact points 155 (155a to 155c) formed on the rear surface of the capacitive button 100 may be implemented differently.

However, the number of the plurality of capacitive contact points 155 (155a to 155c) may be at least three, and although the reason for this will be described in detail below, when the control unit 330 draws virtual straight lines connecting centers of the plurality of capacitive contact points 155

(155a to 155c) to form a virtual polygonal shape, a virtual triangle having at least three sides should be formed.

The input device 310 is an input means which is basically provided in addition to the capacitive button 100, and for example, the input device 310 includes a keyboard (including a software keyboard displayed on a touch screen), a fixed button (for example, a power button, a call button, or the like), a mouse (including a touch panel through which touch & drag functions are performed), and the like.

Through the input device 310, the user may input a command for controlling an operation (or a function, for example, a game operation in the case of a game device) of the control unit 330.

The storage unit 320 stores a control program and setting information necessary for the operation of the control unit 330.

For example, the storage unit 320 may store information of a plurality of capacitive buttons 100 and may store a program for detecting and storing (or registering) information of the capacitive buttons 100.

The control unit 330 may process a command input through the input device 310 and, in this case, a control program corresponding to the input command and setting information is output from the storage unit 320 to process the input command.

For example, the control unit 330 may detect information of the capacitive button 100 attached to the upper surface of the touch screen 340 to store (or register) the information in the storage unit 320 and may detect an input of the capacitive button 100, which has completed registration, and execute an operation (for example, an offensive action or defensive action designated on a button in a game console) corresponding to the capacitive button 100.

When the control unit 330 processes a command (or executes a control program), the touch screen 340 outputs image or text information, detects a user's direct touch input and a touch input of the capacitive button 100, and transmits the touch inputs to the control unit 330.

Meanwhile, the plurality of capacitive buttons 100 may be attached to the touch screen 340, and different commands may be set to the plurality of capacitive buttons 100.

In this case, in order to set different commands to the plurality of capacitive buttons 100, a process of preregistering the capacitive button 100 is required.

In other words, when positions (at which the capacitive buttons 100 are attached, for example, a missile launch button, a direction adjusting button, and the like in a game console) at which the computing device receives touch inputs from the user according to programs, are predetermined, since the plurality of capacitive buttons 100 may be simply attached to the predetermined positions, a process for registering the capacitive buttons 100 is not additionally required.

However, when a position for receiving a touch input from the user is not predesignated and a position for receiving a touch input and a command for executing the touch input may be set by the user's selection, after the capacitive button 100 is attached to a desired position by the user, a process of registering the position at which the button is attached and the command to be executed when the button is pushed should be performed.

Accordingly, a capacitive button interface device and method according to the present embodiment, is a method that, when the user wants to attach at least one or more capacitive buttons 100 to the touch screen 340 of the computing device and use the at least one or more capacitive buttons 100 as illustrated in FIG. 38, the user attaches the at least one or more capacitive buttons 100 to the touch screen 340 of the computing device at desired positions and then sets (or registers) commands to be executed when inputs are input through the capacitive buttons 100.

Hereinafter, a capacitive button interface method of the control unit 330 will be described in more detail with reference to FIGS. 39 to 41.

Figure 39:
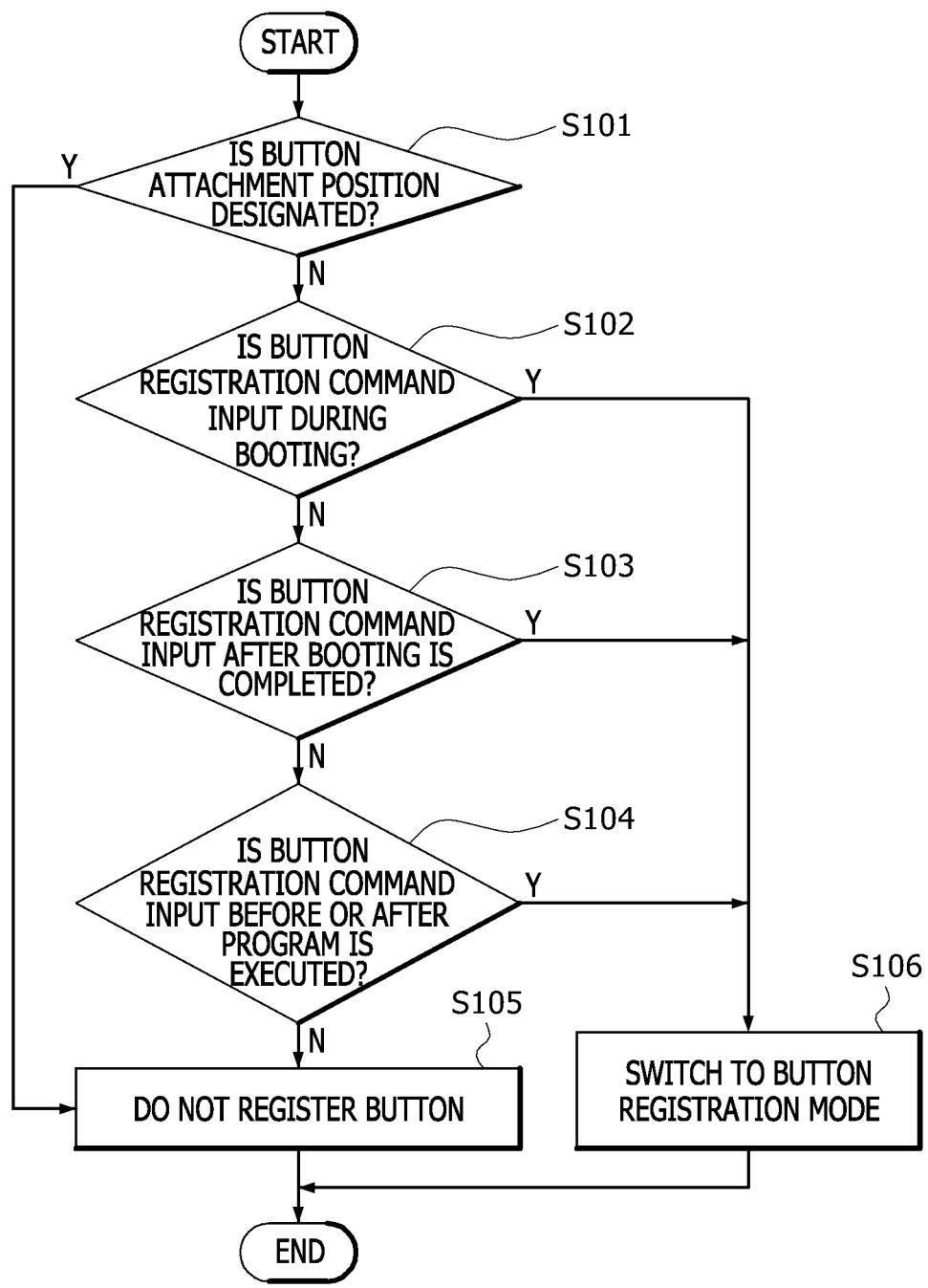
FIG. 39 is a flowchart for describing a capacitive button interface method according to one embodiment of the present invention.

FIG. 39 is a flowchart for describing the capacitive button interface method according to one embodiment of the present invention.

Referring to FIG. 39, the control unit 330 checks whether a button attachment position is predesignated (S101).

For example, whether a position for receiving a touch input from the user (that is, a position at which the capacitive button 100, for example, a missile launch button, a direction adjusting button, or the like in a game console, is attached) is predesignated may be checked by checking whether a predesignated specific flag is set in the computing device (or a program to be executed in the computing device).

As a result of checking whether the button attachment position is predesignated, when the button attachment position is not predesignated (N in S101), the control unit 330 checks whether a button registration command is input during booting of the computing device (S102).

For example, during booting of the computing device, the control unit 330 may check whether a command to execute a button registration program is automatically input by a designated batch program or whether a designated specific key of the input device 310 is manually input by the user.

Accordingly, when the button registration command is input during the booting of the computing device (Y in S102), the control unit 330 immediately switches to a button registration mode (S106), (the operation of the button registration mode will be described with reference to FIG. 40).

However, when the button registration command is not input during the booting of the computing device (N in S102), the control unit 330 checks whether the button registration command is input after the booting of the computing device is completed (S103).

For example, after the booting of the computing device is completed, the control unit 330 may check whether a designated specific key of the input device 310 is input from the user or whether the button registration command is input through the execution of the button registration program.

Accordingly, after the booting of the computing device is completed, when the button registration command is input (Y in S103), the control unit 330 immediately switches to the button registration mode (S106).

By the way, when the button registration command is not input even after the booting of the computing device is completed (N in S103), the control unit 330 checks whether the button registration command is input when a specific program (for example, a game program) is executed (for example, before/after an execution of the game program) in the computing device (S104).

Accordingly, when the specific program (for example, the game program) is executed (for example, before/after the execution of the game program) and the button registration command is input (Y in S104), the control unit 330 immediately switches to the button registration mode (S106).

However, when the button registration command is not input in any of the above situations (S102, S103, and S104, and N in S104), the user does not register the button even though the button attachment position is not specified (S105, for example, there is no capacitive button 100 to be registered by the user).

Figure 40:
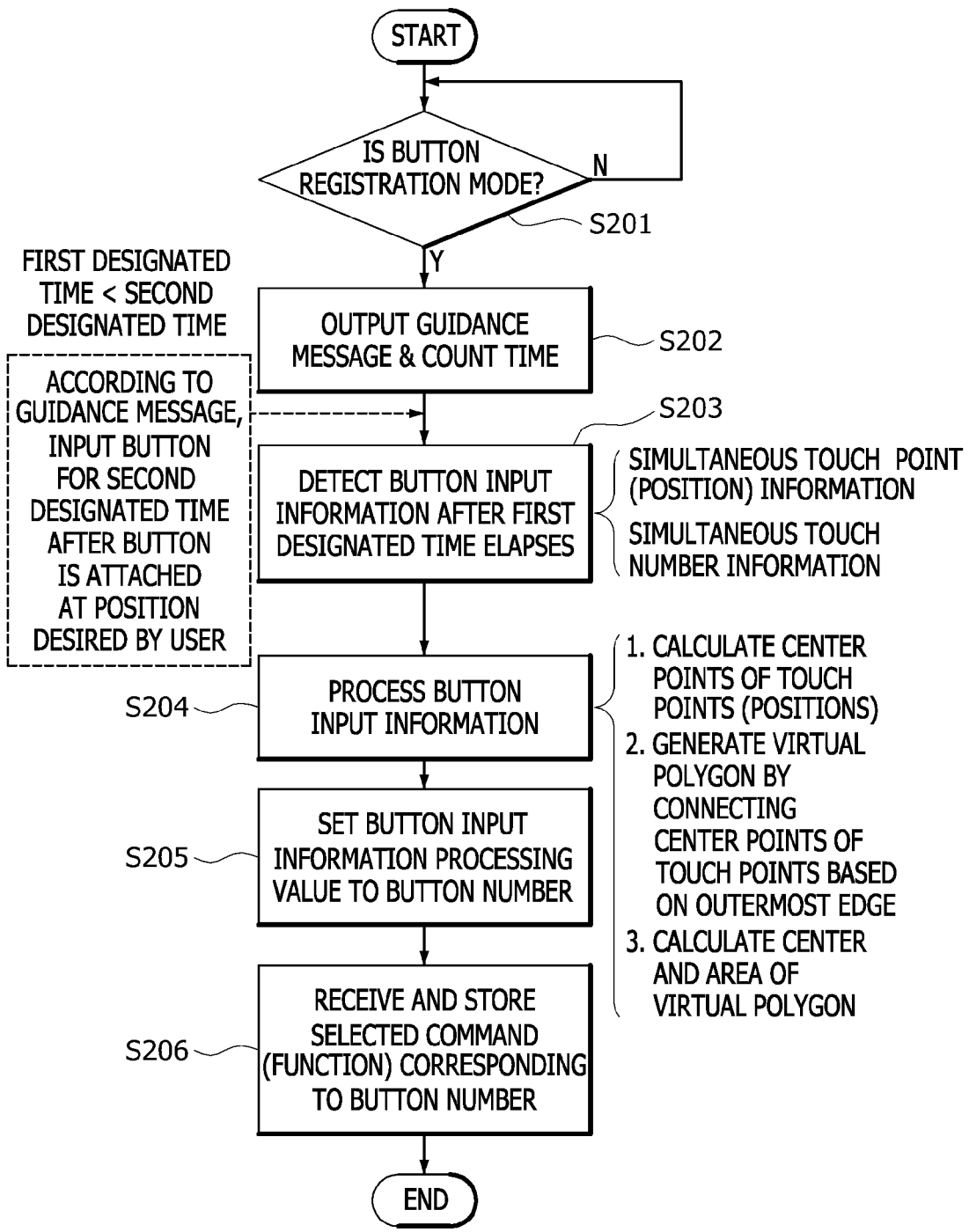
FIG. 40 is a flowchart for describing an operation in a button registration mode in FIG. 39.

FIG. 40 is a flowchart for describing an operation of the button registration mode in FIG. 39.

Referring to FIG. 40, when the control unit 330 switches the computing device to the button registration mode (Y in S201), the control unit 330 outputs a predetermined guidance message (for example, a message guiding a user to attach the capacitive button 100 to a desired position on the touch screen 340 and press the capacitive button 100 for a designated time) and counts the time that the user presses the capacitive button 100 according to the guidance message (S202).

In this case, the control unit 330 may guide the user to press the capacitive button 100 for a second designated time (for example, ten seconds) through the guidance message, and, when the first designated time (for example, five seconds) elapses, the control unit 330 detects button input information about the capacitive button 100 which is pressed by the user (S203).

For example, the button input information includes simultaneous touch point (position) information and simultaneous touch number information based on features of the capacitive button 100 according to the present embodiment. In this case, as already described above, the number of simultaneous touches should be at least three.

When the above button input information (for example, the simultaneous touch point (position) information and the simultaneous touch number information) is detected, the control unit 330 processes the button input information according to a designated method (S204).

For example, the control unit 330 calculates center points of touch points (positions) from the button input information (for example, the simultaneous touch point (position) information and the simultaneous touch number information) and connects the center points of the touch points (positions) using virtual straight lines based on an outermost edge (or outermost angle) to generate a virtual closed polygon. In addition, the control unit 330 calculates the center and area of the virtual closed polygon. For example, it is assumed that the number of simultaneous touches is three, the control unit 330 may connect centers of simultaneous touch points using virtual straight lines to generate a virtual triangle and calculate the center and area of the virtual triangle.

That is, processing values of the button input information include simultaneous touch points (positions), the number of simultaneous touches, center points of touch points (positions), a virtual closed polygon generated by connecting the center points of the touch points using virtual straight lines, and the center and area of the virtual closed polygon.

The button input information and the button input information processing values calculated by processing the button input information are stored in the storage unit 320 and become unique information through which the corresponding capacitive button 100 is distinguished from other capacitive buttons 100.

When the processing of the button input information is completed as described above, the control unit 330 sets the button input information processing values to button numbers (for example, button #1, button #2, button #3, and the like) (S205).

For example, it is assumed that the plurality of capacitive buttons 100 are registered, each of the button numbers (for example, button #1, button #2, button #3, or the like) is set to one of capacitive buttons 100.

In addition, the control unit 330 displays lists of commands (or functions) corresponding to the button numbers (for example, button #1, button #2, button #3, and the like) and then receives the commands (or functions) to correspond to each button selected by the user and stores the commands (or functions) in the storage unit 320 to complete button registration (S206).

Hereinafter, when the registration of the capacitive button 100 is completed as described above and then the user presses the capacitive button 100, a method, in which the control unit 330 detects the pressurization and operates, will be described.

Figure 41:
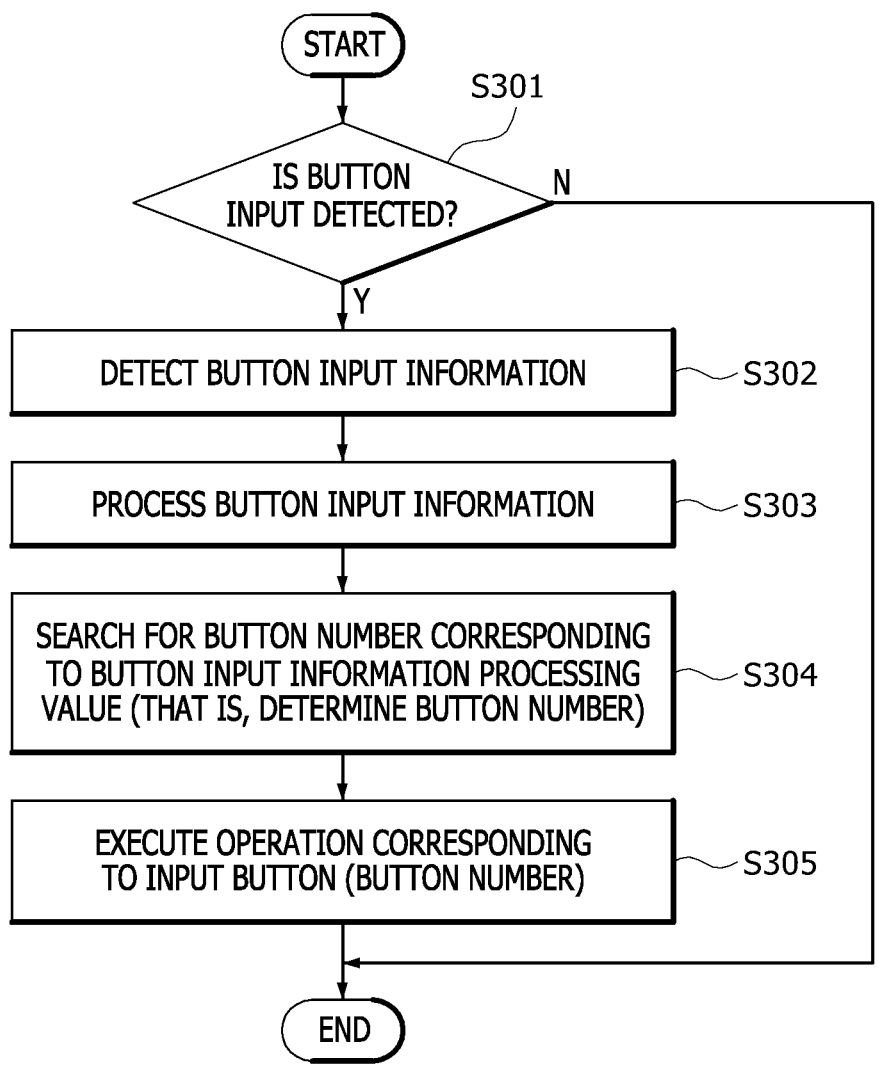
FIG. 41 is a flowchart for describing a method for executing a corresponding operation upon detecting an input of a capacitive button, which has completed registration, in FIG. 40.

FIG. 41 is a flowchart for describing a method for executing a corresponding operation upon detecting an input of a capacitive button 100, which has completed registration, in FIG. 40.

Referring to FIG. 41, when the control unit 330 detects a button input (Y in S301), that is, when the control unit 330 detects pressurization of the preregistered capacitive button 100, the control unit 330 detects button input information for the capacitive button 100 (for example, simultaneous touch point (position) information and simultaneous touch number information) (S302).

When the button input information (for example, the simultaneous touch point (position) information and the simultaneous touch number information) is detected, the control unit 330 processes the button input information according to a designated method and calculates button input information processing values (S303).

For example, in order to calculate the button input information processing values, the control unit 330 calculates center points of touch points (positions) from the button input information (for example, the simultaneous touch point (position) information and the simultaneous touch number information) and connects the center points of the touch points using virtual straight lines based on an outermost edge (or outermost angle) to generate a virtual closed polygon. In addition, the control unit 330 calculates the center and area of the virtual closed polygon. For example, it is assumed that the number of simultaneous touches is three, the control unit 330 may connect centers of simultaneous touch points using virtual straight lines to generate a virtual triangle and calculate the center and area of the virtual triangle.

That is, the button input information processing values include simultaneous touch points (positions), the number of simultaneous touches, center points of the touch points (positions), a virtual closed polygon generated by connecting the center points of the touch points using virtual straight lines, and the center and area of the virtual closed polygon.

In addition, the control unit 330 searches for button numbers corresponding to the calculated button input information processing values from the storage unit 320 (that is, determines the button numbers corresponding to the button input information processing values) (S304).

For example, the storage unit 320 stores the button input information processing values for the capacitive buttons 100, the corresponding button numbers, and operations (or execution commands) which are preregistered in the form of a lookup table.

Accordingly, the control unit 330 searches for the button number corresponding to the button input information processing value and executes the operation (or execution command) set in correspondence to the button number (S305).

As described above, the present embodiment has an effect of controlling various functions of the computing device using a capacitive button by interfacing a plurality of capacitive buttons, which are to be detachably attached, with a surface of a touch screen of the computing device using a touch screen, such as a game console so that the plurality of capacitive buttons are attached at positions desired by a user and desired functions can be executed.

While embodiments of the present invention have been described with reference to embodiments illustrated in the accompanying drawings, this is merely exemplary. It will be understood by those skilled in the conventional art that various modifications and other equivalent example embodiments may be made from the embodiments of the present invention. Therefore, the scope of embodiments of the present invention are defined by the appended claims. In addition, the present invention described in this specification can be implemented through, for example, a method, a process, an apparatus, a software program, a data stream, or a signal. Even when the present invention is described as being implemented in only a single form (for example, as a method), the described features may be implemented in another form (for example, as an apparatus or program). An apparatus may be implemented using appropriate hardware, software, firmware, or the like. A method may be implemented in an apparatus such as a processor which generally refers to a processing device such as a computer, a microprocessor, an integrated circuit, and a programmable logic device. Examples of a processor also include a communication device such as a computer, a cell phone, a portable or personal digital assistant (PDA) terminal, and other devices which facilitate information communication between end-users.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A capacitive button interface device comprising:
   a touch screen;
   a capacitive button which is detachably attached to the touch screen;
   an input device through which an operation control command is input;
   a storage unit which stores a program for registering the capacitive button and setting information; and
   a control unit which detects capacitive button information attached to an upper surface of the touch screen, stores or registers the capacitive button information in the storage unit, detects an input from the capacitive button, which has completed registration, and executes an operation corresponding to the capacitive button;
   wherein, when a position at which a touch input is received from a user is predesignated according to a program executed by a computing device including the capacitive button interface device:
   the capacitive button is attached to a predesignated position; and
   the control unit does not register the capacitive button.

2. The capacitive button interface device of claim 1, wherein the capacitive button includes:
   a button part is formed of a transparent material at an upper portion thereof; and
   an adsorption member attached to the touch screen and a plurality of capacitive contact points which simultaneously protrude to come into contact with the touch screen when the button part is pressed at a lower portion thereof.

3. The capacitive button interface device of claim 2, wherein the number of the capacitive contact points is at least three.

4. The capacitive button interface device of claim 1, wherein when the position at which the touch input is received from the user is not predesignated, the control unit performs button registration after the capacitive button is attached to a position desired by the user and sets a command selected by the user to execute when an input of the capacitive button is received.

5. The capacitive button interface device of claim 1, wherein:
   when a button registration command is input through the input device, the control unit outputs a predesignated guidance message, counts a time for which the user presses the capacitive button according to the guidance message;
   when the time for which the user presses the capacitive button elapses a designated time, the control unit detects button input information for the capacitive button; and
   when the button input information is detected, the control unit processes the button input information to calculate button input information processing values, sets the button input information processing values to a button number, displays a list of commands or functions which correspond to the button number, and stores a command or function selected by the user to correspond to each button in a storage unit to complete button registration.

6. The capacitive button interface device of claim 5, wherein:
   the button input information includes simultaneous touch position information and simultaneous touch number information; and
   the number of simultaneous touches is at least three.

7. The capacitive button interface device of claim 5, wherein the button input information processing values include:
   simultaneous touch points;
   the number of simultaneous touches;
   a center point of each of the touch points;
   a virtual closed polygon generated by connecting the center points of the touch points using virtual straight lines; and
   a center and an area of the virtual closed polygon.

8. A capacitive button interface device comprising:
   a touch screen;
   a capacitive button which is detachably attached to the touch screen;
   an input device through which an operation control command is input;
   a storage unit which stores a program for registering the capacitive button and setting information; and
   a control unit which detects capacitive button information attached to an upper surface of the touch screen, stores or registers the capacitive button information in the storage unit, detects an input from the capacitive button, which has completed registration, and executes an operation corresponding to the capacitive button;
   wherein when an input of a preregistered capacitive button is detected, the control unit detects button input information for the capacitive button, processes the button input information to calculate a button input information processing value, searches for a button number corresponding to the button input information processing value from the storage unit, and executes an operation or command set to correspond to the button number.

9. A capacitive button interface method comprising:
outputting, by a control unit, a predesignated guidance message when a button registration command is input through an input device and counting a time for which a user presses a capacitive button attached to a touch screen according to the guidance message;
detecting, by the control unit, button input information for the capacitive button when a designated time for which the user presses the capacitive button elapses;
processing, by the control unit, the button input information to calculate button input information processing values when the button input information is detected;
setting, by the control unit, the button input information processing values to a button number; and
displaying, by the control unit, a list of commands or functions corresponding to the button number, receiving a command or function selected by the user to correspond to each button, and storing the command or function in a storage unit to complete button registration.

10. The capacitive button interface method of claim 9, wherein:
the button input information includes simultaneous touch position information and simultaneous touch number information; and
the number of simultaneous touches is at least three.

11. The capacitive button interface method of claim 9, wherein the button input information processing values include:
simultaneous touch points;
the number of simultaneous touches;
a center point of each of the touch points;
a virtual closed polygon generated by connecting the center points of the touch points using virtual straight lines; and
a center and an area of the virtual closed polygon.

12. The capacitive button interface method of claim 9, comprising when an input of the capacitive button, which has completed registration, is detected:
detecting, by the control unit, the button input information for the capacitive button;
processing, by the control unit, the button input information to calculate button input information processing values;
searching for, by the control unit, the button number corresponding to the button input information processing values from the storage unit; and
executing, by the control unit, an operation or command set to correspond to the button number.

* * * * *